US00RE45920E

(19) United States
(12) Reissued Patent
Choi et al.

(10) Patent Number: US RE45,920 E
(45) Date of Reissued Patent: Mar. 8, 2016

(54) DIGITAL BROADCASTING SYSTEM AND METHOD OF PROCESSING DATA

(71) Applicant: LG ELECTRONICS INC., Seoul (KR)

(72) Inventors: In Hwan Choi, Seoul (KR); Byoung Gill Kim, Seoul (KR); Jin Woo Kim, Seoul (KR); Hyoung Gon Lee, Seoul (KR); Jong Moon Kim, Seoul (KR); Won Gyu Song, Seoul (KR)

(73) Assignee: LG ELECTRONICS INC., Seoul (KR)

(21) Appl. No.: 14/519,290

(22) Filed: Oct. 21, 2014

Related U.S. Patent Documents

Reissue of:
(64) Patent No.: 8,396,088
Issued: Mar. 12, 2013
Appl. No.: 12/890,459
Filed: Sep. 24, 2010

U.S. Applications:
(63) Continuation of application No. 12/019,194, filed on Jan. 24, 2008, now Pat. No. 7,826,498.

(60) Provisional application No. 60/886,469, filed on Jan. 24, 2007.

(30) Foreign Application Priority Data

Apr. 14, 2007 (KR) ..... 10-2007-0036700

(51) Int. Cl.
*H04J 3/04* (2006.01)
*H04N 21/435* (2011.01)
*H04N 21/235* (2011.01)

(52) U.S. Cl.
CPC ..... *H04N 21/435* (2013.01); *H04N 21/235* (2013.01)

(58) Field of Classification Search
CPC ..... H04N 21/235; H04N 21/2362; H04N 21/435; H04N 21/6131
USPC ..... 370/535; 714/754
See application file for complete search history.

(56) References Cited

U.S. PATENT DOCUMENTS 6,654,376 B1 11/2003 Stacey et al.
6,865,188 B1 3/2005 Stirling et al.

(Continued)

FOREIGN PATENT DOCUMENTS

KR 10-2006-0039728 9/2006
WO 2005/020576 3/2005

OTHER PUBLICATIONS

U.S. Appl. No. 14/584,194, Office Action dated Jun. 26, 2015, 10 pages.

(Continued)

*Primary Examiner* — Majid A Banankhah
(74) *Attorney, Agent, or Firm* — Lee, Hong, Degerman, Kang & Waimey

(57) ABSTRACT

A digital broadcasting system and a method of processing data are disclosed. The method of processing data of a transmitting system includes generating signaling information including service-related transmission parameters of mobile service data, packetizing the generated signaling information to a predetermined data packet format, primarily multiplexing the packetized signaling information and a mobile service data packet including the mobile service data, and secondarily multiplexing the primarily multiplexed data packets and a main service data packet including main service data, thereby transmitting the secondarily multiplexed data packets to at least one transmitter located in a remote site.

14 Claims, 13 Drawing Sheets

(56) References Cited

U.S. PATENT DOCUMENTS

| | | | | |
|---|---|---|---|---|
| 7,106,715 | B1 | 9/2006 | Kelton et al. | |
| 7,221,680 | B2 | 5/2007 | Vijayan et al. | |
| 7,711,045 | B2 | 5/2010 | Park et al. | |
| 7,940,855 | B2 * | 5/2011 | Kim et al. | 375/295 |
| 2002/0159520 | A1 | 10/2002 | Choi et al. | |
| 2002/0172277 | A1 | 11/2002 | Choi et al. | |
| 2002/0181581 | A1 | 12/2002 | Birru et al. | |
| 2002/0186780 | A1 | 12/2002 | Choi et al. | |
| 2004/0090997 | A1 | 5/2004 | Choi et al. | |
| 2004/0184547 | A1 | 9/2004 | Choi et al. | |
| 2004/0199814 | A1 | 10/2004 | Kim et al. | |
| 2006/0212910 | A1 | 9/2006 | Endres et al. | |
| 2007/0076584 | A1 | 4/2007 | Kim et al. | |
| 2007/0217499 | A1 | 9/2007 | Limberg | |
| 2010/0318880 | A1 * | 12/2010 | Choi et al. | 714/758 |
| 2012/0017134 | A1 * | 1/2012 | Lee et al. | 714/758 |

OTHER PUBLICATIONS

U.S. Appl. No. 14/584,194, Final Office Action dated November 3, 2015, 20 pages.

* cited by examiner

| Syntax | No. of bits | Mnemonic |
|---|---|---|
| OM_packet( ) { | | |
| OM_type | 8 | bslbf |
| SI_packet() | | |
| for (i=0;i<N1;i++) { | | |
| stuffing_byte | 8 | bslbf |
| } | | |
| } | | |

FIG. 4A

| Syntax | No. of bits | Mnemonic |
|---|---|---|
| SI_packet( ) { | | |
| service_id | 8 | bslbf |
| program_number | 16 | uimsbf |
| burst_period | 8 | uimsbf |
| reserved | 4 | bslbf |
| super_frame_size | 4 | uimsbf |
| reserved | 2 | bslbf |
| burst_size | 6 | uimsbf |
| reserved | 1 | bslbf |
| turbo_code_mode | 3 | bslbf |
| rs_code_mode | 4 | bslbf |
| } | | |

FIG. 4B

| Syntax | No. of bits | Mnemonic |
|---|---|---|
| SI_packet( ) { | | |
| number_of_services | 8 | uimsbf |
| for (i=0;i<number_of_services;i++ { | | |
| service_id | 8 | bslbf |
| program_number | 16 | uimsbf |
| burst_period | 8 | uimsbf |
| reserved | 4 | bslbf |
| super_frame_size | 4 | uimsbf |
| reserved | 2 | bslbf |
| burst_size | 6 | uimsbf |
| reserved | 1 | bslbf |
| turbo_code_mode | 3 | bslbf |
| rs_code_mode | 4 | bslbf |
| } | | |
| } | | |

FIG. 5

| Syntax | No. of bits | Mnemonic |
|---|---|---|
| OM_packet( ) { | | |
| OM_type | 8 | bslbf |
| packet_number | 16 | uimsbf |
| number_of_services | 8 | uimsbf |
| for (i=0;i<number_of_services;i++) { | | |
| SI_packet() | | |
| } | | |
| for (i=i<N2;i++) { | | |
| stuffing_byte | 8 | bslbf |
| } | | |
| } | | |

FIG. 6

| Turbo Code Mode | Outer code rate of Turbo Code | | |
|---|---|---|---|
| | Region A | Region B | Region C |
| "000" | 1/2 | 1/2 | 1/2 |
| "001" | 1/2 | 1/2 | 1/4 |
| "010" | 1/2 | 1/4 | 1/2 |
| "011" | 1/2 | 1/4 | 1/4 |
| "100" | 1/4 | 1/4 | 1/2 |
| "101" | 1/4 | 1/4 | 1/4 |
| "110" "111" | reserved | reserved | reserved |

FIG. 7A

| RS Code Mode for Region A/B | "00" | "01" | "10" | "11" |
|---|---|---|---|---|
| RS Code | (199,187) | (211,187) | (223,187) | (235,187) |
| # of parity (P) | 12 | 24 | 36 | 48 |

FIG. 7B

| RS Code Mode for Region C | "00" | "01" | "10" | "11" |
|---|---|---|---|---|
| RS Code | (199,187) | (211,187) | (223,187) | (235,187) |
| # of parity (P) | 12 | 24 | 36 | 48 |

FIG. 8A

| Table | PID | Table ID | Description |
|---|---|---|---|
| PAT | 0x0000 | 0x00 | Associates Program Number and PMT PID |
| PMT | Assigned in PAT | 0x02 | Specified PID for components of one or more programs |
| NIT | Assigned in PAT | 0x40 | Physical network parameters such as FDM frequencies, Transponder Numbers, etc. |
| CAT | 0x0001 | 0x01 | Associates one or more EMM streams each with a unique PID |
| STT | 0x1FFB | 0xCD | Serves as a reference for time of day |
| MGT | 0x1FFB | 0xC7 | Provides general information about all of the other tables that comprise the PSIP |
| TVCT | 0x1FFB | 0xC8 | Contains a list of all the channels (Terrestrial) |
| EIT | Assigned in MGT | 0xCB | Describes the events or TV programs associated with each of the virtual channels listed in the VCT. |
| ETT | Assigned in MGT | 0xCC | Carries text messages. Each EIT can have one ETT. |
| RTT | Assigned in MGT | 0xCA | Defines the rating standard that is applicable for each region and/or country. |

FIG. 8B

| Table | Table ID | Table ID |
|---|---|---|
| PAT-E | 0x1FF7 | 0x00 |
| PMT-E | Assigned in PAT-E | 0x02 |
| NIT-E | Assigned in PAT-E | 0x40 |
| CAT-E | 0x1FF9 | 0x01 |
| STT-E | 0x1FF8 | 0xCD |
| MGT-E | 0x1FF8 | 0xC7 |
| TVCT-E | 0x1FF8 | 0xC8 |
| EIT-E | Assigned in MGT-E | 0xCB |
| ETT-E | Assigned in MGT-E | 0xCC |
| RRT-E | Assigned in MGT-E | 0xCA |

DIGITAL BROADCASTING SYSTEM AND METHOD OF PROCESSING DATA

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

This application *is a reissue application of U.S. Pat. No. 8,396,088 B2, issued from U.S. patent application Ser. No. 12/890,459, filed Sep. 24, 2010, which* is a continuation of U.S. application Ser. No. 12/019,194, filed on Jan. 24, 2008, now U.S. Pat. No. 7,826,498, which claims the benefit of earlier filing date and right of priority to Korean Patent Application No. 10-2007-0036700, filed on Apr. 14, 2007, and also claims the benefit of U.S. Provisional Application Ser. No. 60/886,469, filed on Jan. 24, 2007, the contents of which are all hereby incorporated by reference herein in their entirety.

BACKGROUND OF THE INVENTION

1. Field of the Invention

The present invention relates to a digital broadcasting system and a method of processing data.

2. Discussion of the Related Art

The Vestigial Sideband (VSB) transmission mode, which is adopted as the standard for digital broadcasting in North America and the Republic of Korea, is a system using a single carrier method. Therefore, the receiving performance of the receiving system may be deteriorated in a poor channel environment. Particularly, since resistance to changes in channels and noise is more highly required when using portable and/or mobile broadcast receivers, the receiving performance may be even more deteriorated when transmitting mobile service data by the VSB transmission mode.

SUMMARY OF THE INVENTION

Accordingly, the present invention is directed to a digital broadcasting system and a method of processing data that substantially obviate one or more problems due to limitations and disadvantages of the related art.

An object of the present invention is to provide a digital broadcasting system and a method of processing data that are highly resistant to channel changes and noise.

Another object of the present invention is to provide a digital broadcasting system and a method of processing data that can enhance the receiving performance by performing additional encoding on mobile service data and by transmitting the processed data to the receiving system.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method of processing data in a transmitting system includes generating signaling information including service-related transmission parameters of mobile service data, packetizing the generated signaling information to a predetermined data packet format, primarily multiplexing the packetized signaling information and a mobile service data packet including the mobile service data, and secondarily multiplexing the primarily multiplexed data packets and a main service data packet including main service data, thereby transmitting the secondarily multiplexed data packets to at least one transmitter located in a remote site. Herein, the predetermined data packet format may correspond to an operations and maintenance (OM) packet.

The method may further include generating null data packets. In this case, in the step of primarily multiplexing data packets, a plurality of null data packets, the mobile service data packet including the main service data, and the OM packet including the signaling information may be multiplexed at a predetermined data rate, and then transmitted. Also, the transmission parameters may each include at least one of information uniquely identifying a specific mobile service, super frame information, burst information, turbo code information, and RS code information.

In another aspect of the present invention, a method of processing data in a transmitting system includes generating signaling information including service-related transmission parameters of mobile service data, inserting the generated signaling information in a payload region of an operations and maintenance (OM) packet, primarily multiplexing the OM packet and a mobile service data packet including the mobile service data, and secondarily multiplexing the primarily multiplexed data packets and a main service data packet including main service data, thereby transmitting the secondarily multiplexed data packets to at least one transmitter located in a remote site.

In a further aspect of the present invention, a transmitting system includes a first packet generator, a mobile service multiplexer, and a transport multiplexer. The first packet generator generates signaling information including service-related transmission parameters of mobile service data, and packetizes the generated signaling information to a predetermined data packet format. The mobile service multiplexer primarily multiplexes the packetized signaling information and a mobile service data packet including the mobile service data. And, the transport multiplexer secondarily multiplexes the primarily multiplexed data packets and a main service data packet including main service data, thereby transmitting the secondarily multiplexed data packets to at least one transmitter located in a remote site.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 4A and FIG. 4B respectively illustrate examples of SI packet syntax structures according to the present invention;

FIG. 5 illustrates another example of an ON packet syntax structure according to the present invention;

FIG. 6 illustrates an example of a turbo code mode within a transport parameter according to the present invention;

FIG. 7A and FIG. 7B respectively illustrate examples of RS code mode within a transport parameter according to the present invention;

FIG. 8A and FIG. 8B respectively illustrate examples of allocating PIDs of PSI/PSIP tables for main service and mobile service;

DETAILED DESCRIPTION OF THE INVENTION

Figure 1:
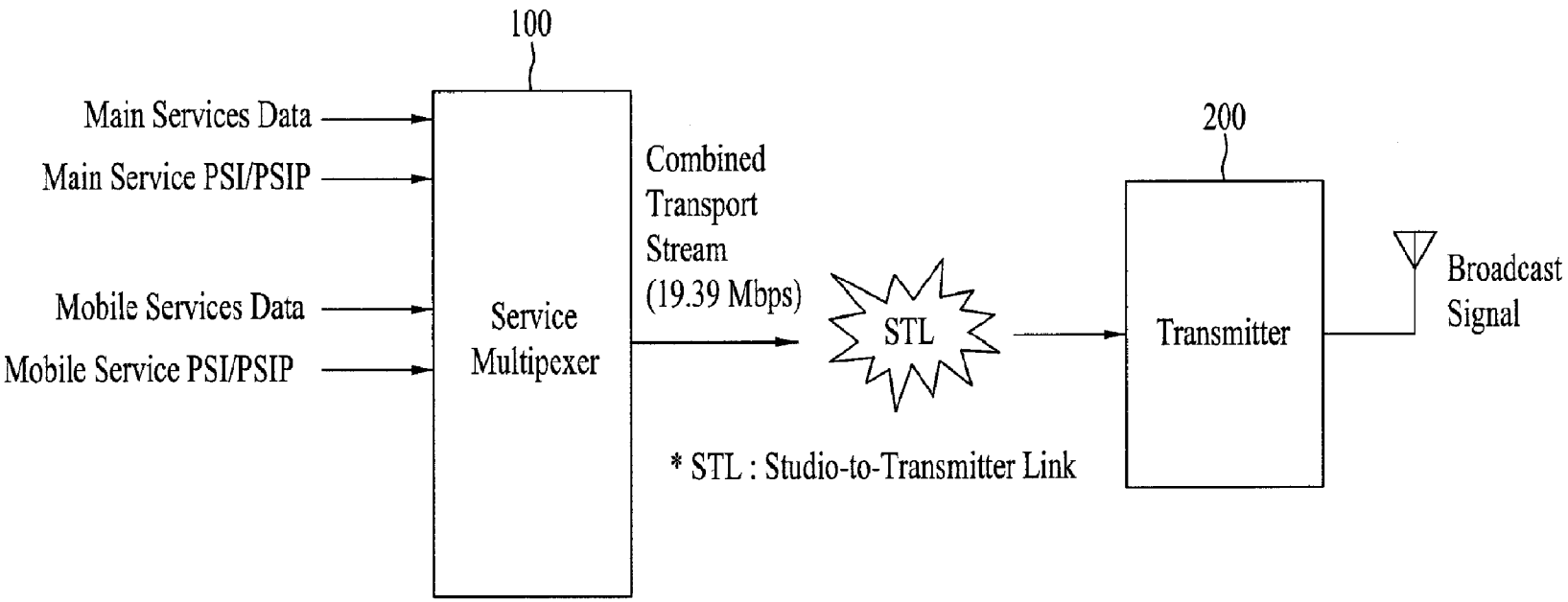
FIG. 1 illustrates a block diagram showing a general structure of a transmitting system according to an embodiment of the present invention.

Reference will now be made in detail to the preferred embodiments of the present invention, examples of which are illustrated in the accompanying drawings. Wherever possible, the same reference numbers will be used throughout the drawings to refer to the same or like parts. In addition, although the terms used in the present invention are selected from generally known and used terms, some of the terms mentioned in the description of the present invention have been selected by the applicant at his or her discretion, the detailed meanings of which are described in relevant parts of the description herein. Furthermore, it is required that the present invention is understood, not simply by the actual terms used but by the meaning of each term lying within.

Among the terms used in the description of the present invention, main service data correspond to data that can be received by a fixed receiving system and may include audio/video (A/V) data. More specifically, the main service data may include A/V data of high definition (HD) or standard definition (SD) levels and may also include diverse data types required for data broadcasting. Also, the known data correspond to data pre-known in accordance with a pre-arranged agreement between the receiving system and the transmitting system. Additionally, in the present invention, mobile service data may include at least one of mobile service data, pedestrian service data, and handheld service data, and are collectively referred to as mobile service data for simplicity. Herein, the mobile service data not only correspond to mobile/pedestrian/handheld service data (M/P/H service data) but may also include any type of service data with mobile or portable characteristics. Therefore, the mobile service data according to the present invention are not limited only to the M/P/H service data.

The above-described mobile service data may correspond to data having information, such as program execution files, stock information, and so on, and may also correspond to A/V data. Most particularly, the mobile service data may correspond to A/V data having lower resolution and lower data rate as compared to the main service data. For example, if an A/V codec that is used for a conventional main service corresponds to a MPEG-2 codec, a MPEG-4 advanced video coding (AVC) or scalable video coding (SVC) having better image compression efficiency may be used as the A/V codec for the mobile service. Furthermore, any type of data may be transmitted as the mobile service data. For example, transport protocol expert group (TPEG) data for broadcasting real-time transportation information may be serviced as the main service data.

Also, a data service using the mobile service data may include weather forecast services, traffic information services, stock information services, viewer participation quiz programs, real-time polls and surveys, interactive education broadcast programs, gaming services, services providing information on synopsis, character, background music, and filming sites of soap operas or series, services providing information on past match scores and player profiles and achievements, and services providing information on product information and programs classified by service, medium, time, and theme enabling purchase orders to be processed. Herein, the present invention is not limited only to the services mentioned above. In the present invention, the transmitting system provides backward compatibility in the main service data so as to be received by the conventional receiving system. Herein, the main service data and the mobile service data are multiplexed to the same physical channel and then transmitted.

Particularly, the present invention uses a transport multiplexer used in a conventional digital broadcasting system so as to multiplex the mobile service data. Additionally, the transmitting system according to the present invention encapsulates non-transport-packet-stream mobile service data (i.e., mobile service data that are not in TS packet formats) into TS packet formats, thereby outputting the encapsulated data. Furthermore, the transmitting system according to the present invention performs additional encoding on the mobile service data and inserts the data already known by the receiving system and transmitting system (e.g., known data), thereby transmitting the processed data. Therefore, when using the transmitting system according to the present invention, the receiving system may receive the mobile service data during a mobile state and may also receive the mobile service data with stability despite various distortion and noise occurring within the channel.

FIG. 1 illustrates a block diagram showing a general structure of a transmitting system according to an embodiment of the present invention. Herein, the transmitting includes a service multiplexer 100 and a transmitter 200. Herein, the service multiplexer 100 is located in the studio of each broadcast station, and the transmitter 200 is located in a site placed at a predetermined distance from the studio. The transmitter 200 may be located in a plurality of different locations. Also, for example, the plurality of transmitters may share the same frequency. And, in this case, the plurality of transmitters receives the same signal. This corresponds to a data transmission using a single frequency network (SFN). Accordingly, in the receiving system, a channel equalizer may compensate signal distortion, which is caused by a reflected wave, so as to recover the original signal. In another example, the plurality of transmitters may have different frequencies with respect to the same channel. This corresponds to a data transmission using a multiple frequency network (MFN).

A variety of methods may be used for data communication each of the transmitters, which are located in remote positions, and the service multiplexer. For example, an interface standard such as a synchronous serial interface for transport of MPEG-2 data (SMPTE-310M). In the SMPTE-310M interface standard, a constant data rate is decided as an output data rate of the service multiplexer. For example, in case of the SVSB mode, the output data rate is 19.39 Mbps, and, in case of the 16VSB mode, the output data rate is 38.78 Mbps. Furthermore, in the conventional 8VSB mode transmitting system, a transport stream (TS) packet having a data rate of approximately 19.39 Mbps may be transmitted through a single physical channel. Also, in the transmitting system according to the present invention provided with backward compatibility with the conventional transmitting system, additional encoding is performed on the mobile service data. Thereafter, the additionally encoded mobile service data are multiplexed with the main service data to a TS packet form, which is then transmitted. At this point, the data rate of the multiplexed TS packet is approximately 19.39 Mbps.

At this point, the service multiplexer 100 receives at least one type of main service data and program specific information/program and system information protocol (PSI/PSIP) table data for each main service so as to encapsulate the received data to a TS packet. Also, the service multiplexer 100 receives at least one type of mobile service data and PSI/PSIP table data for each mobile service and encapsulates the received data to transport stream (TS) packets. Subsequently, the TS packets are multiplexed according to a predetermined multiplexing rule and outputs the multiplexed packets to the transmitter 200.

Figures 2, 3:
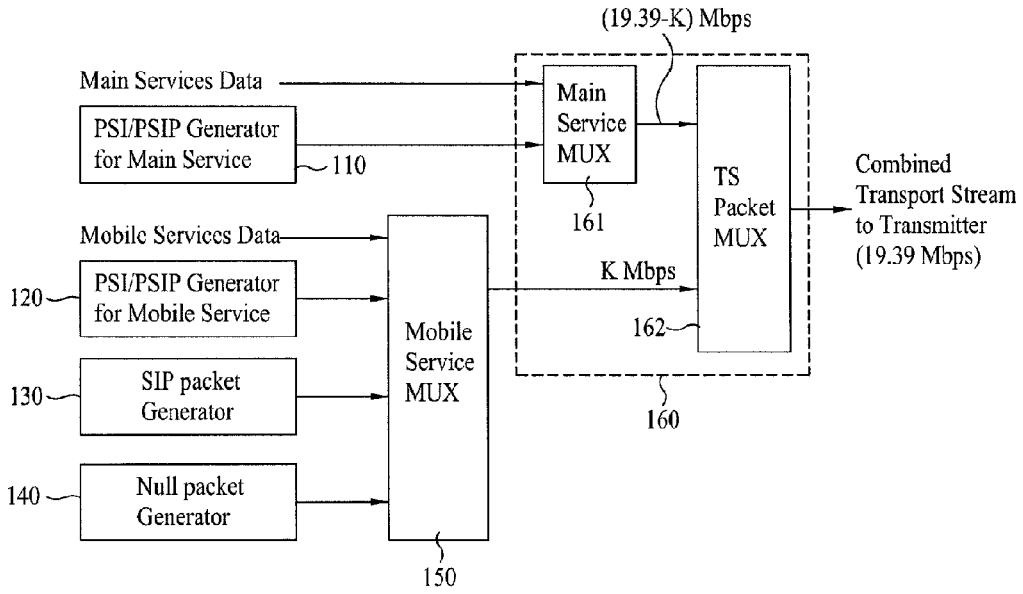
FIG. 2 illustrates a block diagram showing an example of a service multiplexer of FIG. 1.
FIG. 3 illustrates an example of an OM packet syntax structure according to the present invention.

FIG. 2 illustrates a block diagram showing an example of the service multiplexer. The service multiplexer includes a main service PSI/PSIP generator 110, a mobile service PSI/PSIP generator 120, a system information (SI) packet generator 130, a null packet generator 140, a mobile service multiplexer 150, and a transport multiplexer 160. The transport multiplexer 160 may include a main service multiplexer 161 and a transport stream (TS) packet multiplexer 162. Referring to FIG. 2, at least one type of compression encoded main service data and the PSI/PSIP table data generated from the main service PSI/PSIP generator 110 are inputted to the main service multiplexer 161 of the transport multiplexer 160. The main service multiplexer 161 encapsulates each of the inputted main service data and PSI/PSIP table data to MPEG-2 TS packet forms. Then, the MPEG-2 TS packets are multiplexed and outputted to the TS packet multiplexer 162. Herein, the data packet being outputted from the main service multiplexer 161 will be referred to as a main service data packet for simplicity.

Thereafter, at least one type of the compression encoded mobile service data and the PSI/PSIP table data generated from the mobile service PSI/PSIP generator 130 are inputted to the mobile service multiplexer 150. The mobile service multiplexer 150 encapsulates each of the inputted mobile service data and PSI/PSIP table data to MPEG-2 TS packet forms. Then, the MPEG-2 TS packets are multiplexed and outputted to the TS packet multiplexer 162. Herein, the data packet being outputted from the mobile service multiplexer 150 will be referred to as a mobile service data packet for simplicity.

At this point, the transmitter 200 requires identification information in order to identify and process the main service data packet and the mobile service data packet. Herein, the identification information may use values pre-decided in accordance with an agreement between the transmitting system and the receiving system, or may be configured of a separate set of data, or may modify predetermined location value with in the corresponding data packet. As an example of the present invention, a different packet identifier (PID) may be assigned (or allocated) to identify each of the main service data packet and the mobile service data packet. More specifically, by allocating a PID that is not used in the main service to the mobile service, the transmitter 200 may be able to refer to the PID of the data packet that is being received, thereby being capable of identifying (or distinguishing) the main service data packet and the mobile service data packet.

In another example, by modifying a synchronization data byte within a header of the mobile service data, the service data packet may be identified by using the synchronization data byte value of the corresponding service data packet. For example, the synchronization byte of the main service data packet directly outputs the value decided by the ISO/IEC13818-1 standard (i.e., 0x47) without any modification. The synchronization byte of the mobile service data packet modifies and outputs the value, thereby identifying the main service data packet and the mobile service data packet. Conversely, the synchronization byte of the main service data packet is modified and outputted, whereas the synchronization byte of the mobile service data packet is directly outputted without being modified, thereby enabling the main service data packet and the mobile service data packet to be identified.

A plurality of methods may be applied in the method of modifying the synchronization byte. For example, each bit of the synchronization byte may be inversed, in other words, bitwise inversion may be performed (e.g., 0xB8), or only a portion of the synchronization byte may be inversed (e.g., 0x48). As described above, any value that can be used to identify the main service data packet and the mobile service data packet may be used as the identification information. Therefore, the scope of the present invention is not limited only to the example set forth in the description of the present invention.

Meanwhile, a transport multiplexer used in the conventional digital broadcasting system may be used as the transport multiplexer 160 according to the present invention. More specifically, in order to multiplex the mobile service data and the main service data and to transmit the multiplexed data, the data rate of the main service is limited to a data rate of (19.39-K) Mbps. Then, K Mbps, which corresponds to the remaining data rate, is assigned as the data rate of the mobile service. Thus, the transport multiplexer which is already being used may be used as it is without any modification. Herein, the transport multiplexer 160 multiplexes the main service data packet being outputted from the main service multiplexer 161 and the mobile service data packet being outputted from the mobile service multiplexer 150. Thereafter, the transport multiplexer 160 transmits the multiplexed data packets to the transmitter 200 at a constant data rate (e.g., a data rate of 19.39 Mbps).

However, in some cases, the output data rate of the mobile service multiplexer 150 may not be equal to K Mbps. For example, when the service multiplexer 100 assigns K Mbps of the 19.39 Mbps to the mobile service data, and when the remaining (19.39-K) Mbps is, therefore, assigned to the main service data, the data rate of the mobile service data that are multiplexed by the service multiplexer 100 actually becomes lower than K Mbps. This is because the pre-processor of the transmitter 200 performs additional encoding on the mobile service data, thereby increasing the amount of data. Eventually, the data rate of the mobile service data, which may be transmitted from the service multiplexer 100, becomes smaller than K Mbps.

For example, since the pre-processor of the transmitter 200 performs an RS frame encoding process and an encoding process on the mobile service data at a coding rate of at least ½, the amount of the data outputted from the pre-processor is increased to more than twice the amount of the data initially inputted to the pre-processor. Therefore, the outputted data rate of the mobile service multiplexer 150 is always smaller than K/2. Accordingly, the sum of the data rate of the main service data and the data rate of the mobile service data, both being multiplexed by the service multiplexer 100, becomes smaller than 19.39 Mbps.

The service multiplexer 100 of the present invention may match (or put in accord) the data rate of the final output data of the mobile service multiplexer 150 to a constant rate (e.g., K Mbps) according to various embodiments of the present invention. In an embodiment, the Si packet generator 130 generates a transmission parameter including a signaling information (SI) packet related (or associated) with the mobile service. Thereafter, the mobile service multiplexer 150 may multiplex the SI packet and the mobile service data packet. In another embodiment, the null packet generator 140 generates a null data packet. Then, the mobile service multiplexer 150 may multiplex the null data packet and the mobile service data packet. Herein, the mobile service data packet includes at least one of mobile service data and PSI/PSIP table data. At this point, the mobile service multiplexer 150 may multiplex the mobile service data packet and the SI packet, thereby matching (or fixing) the data rate of the output data to K Mbps. Alternatively, the mobile service multiplexer 150 may multiplex the mobile service data packet, the SI packet, and the null data packet, thereby matching (or fixing) the data rate of the output data to K Mbps. Furthermore, the mobile service multiplexer 150 may also multiplex the mobile service data packet and the SI packet, thereby matching (or fixing) the data rate of the output data to K Mbps.

The SI packet is generated for two reasons. One of the reasons for generating the SI packet is to match (or fix) the output data rate of the mobile service multiplexer 150 to a constant rate. The other reason for generating the SI packet is to provide a transmission parameter to the transmitter 200, which requires the transmission parameter to process the mobile service data. Furthermore, a plurality of mobile service types may be inputted to the mobile service multiplexer 150. When a plurality of mobile service types is being inputted, and when a plurality of mobile service data types is transmitted from the transmitter in the form of burst units, only one mobile service data type may be set to be included in one burst-on section. In this case, each of the plurality of mobile service data types is identified in burst units. Therefore, in order to enable the transmitter 200 to receive the plurality of mobile service data types and to transmit the received data types in burst units, each mobile service is required to be identified.

For this, according to an embodiment of the present invention, the SI packet generator 130 generates a SI packet so that the generated SI packet and the mobile service data packet can be multiplexed on a one-to-one (1:1) basis. At this point, the SI packet generator 130 may allocate at least one field in the payload portion of the SI packet and may also indicate information required for identifying the mobile services (e.g., mobile service identifiers) on the allocated field and output the processed data (or packet). More specifically, the SI packet generator 130 generates a SI packet of the corresponding mobile service data packet, which is to be multiplexed on a one-to-one (1:1) basis by the mobile service multiplexer 150. Then, the generated SI packet to the mobile service multiplexer 150. Accordingly, by parsing the field allocated to the payload of the SI packet, the transmitter 200 may be capable of identifying each of the mobile service. This method is more efficient when the method is applied to an embodiment, wherein a synchronization byte is used as the transmission parameter for identifying (or distinguishing) the mobile service data packet and the main service data packet. At this point, the transmitter 200 requires an identification information for identifying the SI packet, so that the transmitter 200 can identify the SI packet and extract a transmission parameter from the identified SI packet.

According to an embodiment of the present invention, the SI packet is inserted in a payload region (or field) within an operations and maintenance (OM) packet (or OMP). Accordingly, the transmitter 200 may be able to indicate an identification information that can recognize (or acknowledge) whether or not an SI packet has been inserted in an OM_type field of the corresponding OM packet. More specifically, a packet referred to as an OMP is defined for the purpose of operating and managing the transmitting system. For example, the OMP is configured in accordance with the MPEG-2 TS packet format, and the corresponding PID is given the value of 0x1FFA. The OMP is configured of a 4-byte header and a 184-byte payload. Herein, among the 184 bytes, the first byte corresponds to an OM_type field, which indicates the type of the OM packet. Also, the remaining 183 bytes correspond to an OM_payload field, wherein actual data bytes are inserted. In the present invention, among the values of the reserved fields within the OM_type field, a pre-arranged value is used, thereby indicating that the SI packet has been inserted in the corresponding OM packet. Accordingly, the transmitter 200 may find (or identify) the OMP by referring to the PID. Also, by parsing the OM_type field within the OMP, the transmitter 200 can verify whether the SI packet has been inserted in the corresponding OM packet.

FIG. 3 illustrates a syntax structure of the OM packet according to an embodiment of the present invention. Particularly, FIG. 3 shows a 184-byte syntax configuration (or structure) excluding the 4-byte packet header. Herein, FIG. 3 shows an example of inserting a SI packet (SI_packet( )) within an OM_payload field located after the OM_type field, transmitting a transmission parameter related (or associated) with the mobile service. Although the size of the OM_payload field of the ON packet is equal to 183 bytes, the size of the SI packet may be smaller than or equal to 183 bytes. If the size of the SI packet is smaller than 183 bytes, the remaining bytes may be filled with stuffing bytes by the stuffing_byte field following the service_information( ) field. Herein, the stuffing_byte field is repeated as much as the lacking number of bytes, thereby maintaining the OM_payload portion of the corresponding OM packet to 183 bytes. More specifically, the stuffing_byte field is assigned with 8 bits, which indicates data bytes used for filling (or completing) the empty data space within the payload. At this point, the value N1 corresponding to the number of times the stuffing_byte field is repeated (i.e., the length of the stuffing byte) represents 183—[the length of the SI_packet( )field].

The transmission parameters transmitted to the SI packets correspond to signaling information required by the transmitter and/or the receiving system for processing the mobile service data. Examples of the transmission parameter may include a mobile service identification information, a data group information, a region information within a specific data group, a RS frame information, a super frame information, a burst information, a turbo code information, a RS code information, and so on. The burst information includes a burst size information, a burst period information, a time to next burst (TNB) information, and so on. Herein, a burst period refers to a cycle period according to which a burst that transmits the same type of mobile service is being repeated. The burst size indicates the number of data groups included in a single burst. Also, the data group includes a plurality of mobile service data packets, and a plurality of such data groups is grouped to configure a burst. The burst section indicates the beginning (or starting) point of the current burst up to the beginning (or starting) point of the next burst. Herein, the burst section includes a section including the data group (also referred to as a burst-on section) and a section not including the data group (also referred to as a burst-off section). More specifically, a burst-on section consists of a plurality of fields, wherein one field may include on data group.

Furthermore, the transmission parameter may also include information on an encoding method used for encoding symbol region signals for transmitting the mobile service data, and also multiplexing information on how the multiplexing is performed on the main service data and mobile service data, or on a plurality of mobile service data types. The information included in the transmission parameter are merely exemplary to facilitate the understanding of the present invention. And, the adding and deleting of the information included in the transmission parameter may be easily modified and changed by anyone skilled in the art. Therefore, the present invention is not limited to the examples proposed in the description set forth herein.

FIG. 4A illustrates an exemplary syntax structure of a SI packet generated from the SI packet generator 130. Herein, the SI packet may be inserted in an OM_payload field within the OM packet of FIG. 3. At this point, the OM packet having the SI packet inserted therein may either be generated from the SI packet generator 130, or be generated from the mobile service multiplexer 150. Furthermore, the mobile service data packet and the OM packet are multiplexed by the mobile service multiplexer 150 and then outputted. Referring to FIG. 4A, the SI packet structure corresponds to an example of the SI packet being in a one-to-one correspondence with a single mobile service. At this point, the OM packet including the SI packet and the mobile service data packet may be multiplexed on a one-to-one (1:1) basis and then transmitted.

Referring to FIG. 4A, the SI_packet( ) field includes a service_id field, a program_number field, a burst_period field, a super_frame_size field, a burst_size field, a turbo_code_mode field, and a RS_code_mode field. Herein, the terminology mentioned in the SI_packet( ) field, such as data group, region of the data group, super frame, burst, turbo code mode, RS code mode, and so on, will be briefly described while describing each of the corresponding fields. Furthermore, the above-mentioned terms will be described in more detail when describing the transmitter 200 with reference to FIG. 9 in a later process.

In the embodiment of the present invention, the service_id field is an 8-bit field, which indicates a mobile service identifier (i.e., mobile service ID) that can solely identify each of the mobile services (or programs). For example, when transmitting multiple mobile service data types, the service_id field may be used as an identifier for distinguishing the plurality of mobile services. The program_number field is assigned with 16 bits. Herein, for example, the program_number field indicates a number of a program related to a mobile service defined by the PSI/PSIP table.

The burst_period field is an 8-bit field, which indicates the cycle period of a burst (i.e., burst period). More specifically, when the transmitter 200 transmits mobile service data in burst units, the burst_period field is used to indicate a repetition period of a burst that transmits identical types of mobile services. Herein, the number of data fields indicates the burst repetition period. The burst_period field corresponds to one of the transmission parameters that are transmitted to the receiving system along with the corresponding mobile service data from the transmitter 200. Herein, 4 reserved bits may be allocated after the burst_period field.

The super_frame_size field is a 4-bit field, which indicates the size of a super frame. More specifically, the transmitter 200 configures a RS frame so as to perform error correction encoding. Then, the transmitter 200 groups a plurality of error correction encoded RS frames, thereby configuring a super frame. The transmitter 200 may perform interleaving (or row permutation) processes in super frame units. In this case, the super_frame_size field indicates the number of RS frames configuring the super frame. Furthermore, the super_frame_size field corresponds to one of the transmission parameters being transmitted along with the mobile service data, when the corresponding mobile service data are transmitted to the receiving system from the transmitter 200. Herein, 2 reserved bits may be allocated after the super_frame_size field.

The burst_size field is a 6-bit field, which indicates the size of a burst. More specifically, when the transmitter 200 transmits the mobile service data in burst units, the burst_size field indicates the number of data groups configuring a burst section. The burst_size field also corresponds to one of the transmission parameters being transmitted along with the mobile service data, when the corresponding mobile service data are transmitted to the receiving system from the transmitter 200. Herein, 1 reserved bit may be allocated after the burst_size field.

Figure 11A:
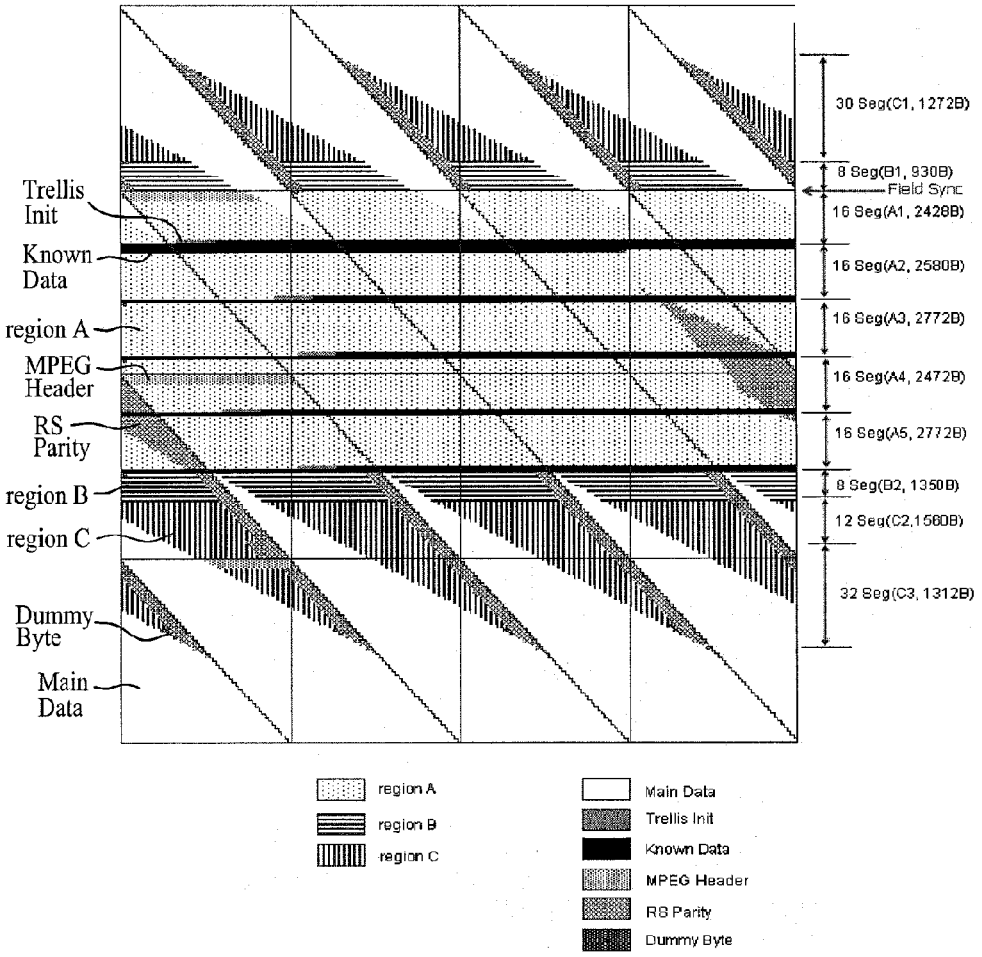
FIG. 11A and FIG. 11B illustrate data configuration before and after a data deinterleaver in a transmitting system according to the present invention.
Figure 11B:
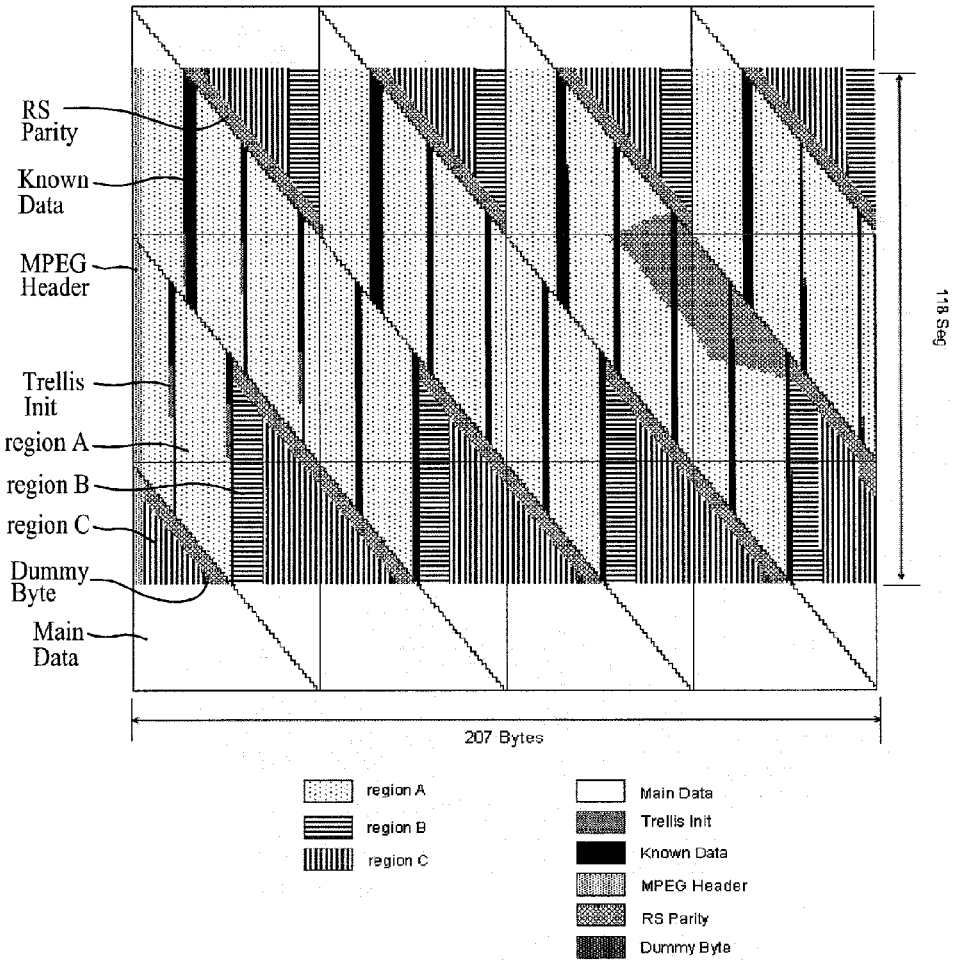

The turbo_code_mode field is a 3-bit field, which indicates the turbo code mode applied to each region within the data group. For example, the transmitter 200 may group a plurality of mobile service data packets so as to configure a data group, and the data group may then be divided into a plurality of hierarchical regions. Also, a plurality of data groups may be grouped to form a burst. At this point, a data group is divided into a plurality of regions (e.g., regions A, B, and C), as shown in FIG. 11A and FIG. 11B. The method of dividing the regions within the data group and each of the regions will be described in detail with reference to FIG. 11A and FIG. 11B along with the detailed description of the transmitter 200. FIG. 6 illustrates a table showing an example of a turbo code mode being applied to regions A/B and to region C within a data group. For example, when the value of the turbo_code_mode field is equal to '001', the transmitter 200 encodes the mobile service data that are to be allocated to regions A/B at a coding rate of ½ and encodes the mobile service data that are to be allocated to region C at a coding rate of ¼.

The RS_code_mode field is a 4-bit field, which indicates the RS code mode applied to each region within the data group. For example, when a data group is divided into regions A, B, and C, as shown in FIG. 11A and FIG. 11B, FIG. 7A illustrates an example of a RS code mode being applied to regions A/B. And, FIG. 7B illustrates an example of a RS code mode being applied to region C. For example, when the value of the RS_code_mode field is equal to '1110', the transmitter 200 performs (235,187)-RS encoding on a RS frame that is to be allocated to regions A/B, thereby generating 48 parity bytes. The transmitter 200 then performs (223,187)-RS encoding on a RS frame that is to be allocated to region C, thereby generating 36 parity bytes.

The order, position, and definition of the fields allocated to the SI_packet( ) field described in FIG. 4A are merely examples presented to facilitate and simplify the understanding of the present invention. In other words, the order, position, and definition of the fields allocated to the SI_packet( ) field may be easily altered or modified by the system designer. Therefore, the present invention will not be limited to the examples given in the above-described embodiment of the present invention.

FIG. 4B illustrates an example of a SI packet structure corresponding to multiple mobile services. Herein, the SI packet may also be inserted in an OM_payload field within the OM packet of FIG. 3. At this point, the OM packet having the SI packet inserted therein may either be generated from the SI packet generator 130, or be generated from the mobile service multiplexer 150. Furthermore, the mobile service data packet and the OM packet are multiplexed by the mobile service multiplexer 150 and then outputted.

The SI_packet( ) field of FIG. 4B may include a number_of_services field and a transmission parameter field that is repeated in accordance with the number_of_services field value.

More specifically, the number_of_services field is also assigned with 8 bits. Herein, the number_of_services field indicates the type of mobile service being multiplexed by the mobile service multiplexer 150. For example, when 4 different types of mobile service data are being inputted, the value of the number_of_services field is equal to '4(–00000100)'. The transmission parameter field may include a service_id field, a program_number field, a burst_period field, a super_frame_size field, a burst_size field, a turbo_code_mode field, and a RS_code_mode field. Herein, since the definition for each field within the transmission parameter field is identical to those shown in FIG. 4A, a detailed description of the same will be omitted for simplicity.

Meanwhile, in some occasion, based upon the number of mobile services and the transmission parameters included in each mobile service, all of the desired (or wanted) transmission parameters may not be transmitted to a single OM packet. In this case, one or more OM packets may be used to transmit all transmission parameters. At this point, the OM packet having the SI packet inserted therein may be inserted based upon a constant cycle period.

FIG. 5 illustrates the syntax structure for transmitting transmission parameters corresponding to all mobile service types to a single OM packet, when a SI packet corresponding to a single mobile service type is generated, as shown in FIG. 4A. More specifically, FIG. 5 illustrates an exemplary syntax structure of an OM packet corresponding to multiple mobile services. Herein, the 184 bytes excluding a 4-byte packet header may include an OM_type field, a packet_number field, a number_of_services field, and a SI_packet( ) field, which is repeated as many times as the number_of_services field value. If the size of the field including the OM_type field, the packet_number field, the number_of_services field, and the SI_packet( ) field, which is repeated as many times as the number_of_services field value, is smaller than 183 bytes, the remaining bytes may be filled with stuffing bytes by the stuffing_byte field following the following the corresponding field. Herein, the stuffing_byte field is repeated as many times as the lacking number of bytes, thereby maintaining the size of the OM_payload field of the corresponding OM packet to 183 bytes. For example, the stuffing_byte field is an 8-bit field, which indicates data bytes used for filling the empty spaces within the corresponding field.

The OM_type field is an 8-bit field, which can indicate identification information that can recognize the insertion of a SI packet within the corresponding OM packet. The packet_number field is a 16-bit field, which identifies a count value of the corresponding packet among the total count value of 60 fields. The packet_number field may be used for identifying the beginning (or starting) point of a burst period. For example, the packet_number field may recognize the beginning point of a 60-field burst period. The number_of_services field is also assigned with 8 bits. Herein, the number_of_services field indicates the type of mobile service being multiplexed by the mobile service multiplexer 150. For example, when 4 different types of mobile service data are being inputted, the value of the number_of_services field is equal to '4 (32 00000100)'.

The SI_packet( ) field is repeated as many times as the number_of_services field value, thereby transmitting the transmission parameters corresponding to each mobile service. Herein, the same fields included in the SI_packet( ) field shown in FIG. 4A may also be included in the SI_Packet( ) of FIG. 5. For example, the SI_packet( ) field may include a service_id field, a program_number field, a burst_period field, a super_frame_size field, a burst_size field, a turbo_code_mode field, and a RS_code_mode field. The order, position, and definition of the fields allocated to the payload field of the OM packet shown in FIG. 5 are merely examples presented to facilitate and simplify the understanding of the present invention. In other words, the order, position, and definition of the fields allocated to the payload field of the OM packet may be easily altered or modified by the system designer. Therefore, the present invention will not be limited to the examples given in the above-described embodiment of the present invention.

Meanwhile, the mobile services may each be identified by allocating different PIDs, none of which being used by any of the main services. More specifically, each mobile service is allocated with a unique PID. At this point, the transmitter 200 can refer to the PSI/PSIP table in order to recognize a program map corresponding to the mobile service. And, in some occasion, when the SI packet generator 130 generates SI packets (or OM packets) so that each SI packet can be multiplexed with a mobile service data packet on a one-to-one (1:1) basis, the final data rate of the mobile service multiplexer 150 may not be equal to K Mbps. In this case, the null packet generator 140 generates null data packets and outputs the generated null data packet to the mobile service multiplexer 150, thereby matching (or fixing) the final data rate of the mobile service multiplexer to K Mbps.

Thereafter, the null data packet is transmitted to the transmitter 200 and then deleted (or discarded). In other words, the null data packet is not transmitted to the receiving system. For this, an identification information for identifying the null data packet is required. Similarly, the identification information for identifying the null data packet may use a value that is pre-decided based upon an agreement between the transmitting system and the receiving system. Alternatively, the identification information for identifying the null data packet may be configured of a separate set of data. Furthermore, the identification information for identifying the null data packet may also modify the value of a predetermined position within the null data packet and use the modified value. For example, the null packet generator 140 may modify the value of the synchronization byte within the header of the null data packet and then use the modified value as the identification information. Alternatively, the null packet generator 140 may set the transport error_indicator flag field to '1' and use this value as the identification information.

In the embodiment of the present invention, the transport_error_indicator flag field of the header within the null data packet is used as the identification information for identifying the null data packet. In this case, the transport_error_indicator flag field is set to '1', and the transport_error_indicator flag fields included in all of the other data packets, apart from the null data packet, are reset to '0', thereby identifying the null data packet. Any field value that can identify the null data packet may be used as the identification information. Therefore, the present invention is not limited only to the examples given in the description of the present invention.

PSI/PSIP for Mobile Service

Meanwhile, the PSI/PSIP tables generated from both the PSI/PSIP generator 110 for main service and PSI/PSIP generator 120 for mobile service of the service multiplexer 100 correspond to system information required by the receiving system for receiving and recoding the main service data and mobile service data. In some occasions, such system information may also be referred to as service information. More specifically, the system information not only includes the information on the system itself but may also include other types of information, such as channel information, program information, event information, and so on.

The PSI table is an MPEG-2 system standard defined for identifying the channels and the programs. The PSIP table is an advanced television systems committee (ATSC) standard that can identify the channels and the programs. The PSI table may include a program association table (PAT), a conditional access table (CAT), a program map table (PMT), and a network information table (NIT). Herein, the PAT corresponds to special information that is transmitted by a data packet having a PID of '0'. The PAT transmits PID information of the PMT and PID information of the NIT corresponding to each program. The CAT transmits information on a paid broadcast system used by the transmitting system. The PMT transmits PID information of a transport stream (TS) packet, in which program identification numbers and individual bit sequences of video and audio data configuring the corresponding program are transmitted, and the PID information, in which PCR is transmitted. The NIT transmits information of the actual transmission network.

The PSIP table may include a virtual channel table (VCT), a system time table (STT), a rating region table (RRT), an extended text table (ETT), a direct channel change table (DCCT), an event information table (EIT), and a master guide table (MGT). The VCT transmits information on virtual channels, such as channel information for selecting channels and information such as packet identification (PID) numbers for receiving the audio and/or video data. More specifically, when the VCT is parsed, the PID of the audio/video data of the broadcast program may be known. Herein, the corresponding audio/video data are transmitted within the channel along with the channel name and the channel number. The STT transmits information on the current data and timing information. The RRT transmits information on region and consultation organs for program ratings. The ETT transmits additional description of a specific channel and broadcast program. The EIT transmits information on virtual channel events (e.g., program title, program start time, etc.). The DCCT/DCCSCT transmits information associated with automatic (or direct) channel change. And, the MGT transmits the versions and PID information of the above-mentioned tables included in the PSIP.

At this point, the PAT for main service and the PAT for mobile service may each be generated independently (or separately). Alternatively, the PAT for main service and the PAT for mobile service may be combined and, then, generated as a single PAT. In order to do so, the PSI/PSIP generator 110 for main service and the PSI/PSIP generator 120 for mobile service may be integrated. Also, even though the PAT for main service and the PAT for mobile service are combined so as to be generated as a single PAT, the PMT for main service and the PMT for mobile service may each be generated independently (or separately).

For example, a PMT for main service and a PMT for mobile service may be equally allocated and, then, inputted to the transport multiplexer 160. In this case, the transport multiplexer 160 may change one PID among the two PMTs and may also correct (or modify) the PMT information included in the PAT. Also, when a plurality of mobile service types exists, a plurality of PMTs may be generated. At this point, each PMT is given a unique PID. Furthermore, when identifying the main service data packet and the mobile service data packet by using the synchronization byte, the syntax, PID, and table ID of the PSI/PSIP table for mobile service may be used identically as those of the PSI/PSIP table for main service.

FIG. 8A illustrates PID and table ID of the PSI/PSIP tables used in the main service. Referring to FIG. 8A, the tables each having a fixed PID value includes the PAT (e.g., 0x0000), the CAT (e.g., 0x0001), the MGT (e.g., 0x1FFB), the VCT (e.g., 0x1FFB), and the RRT (e.g., 0x1FFB). Also, in case of the tables each having variable PID values, the PID values for the PMT and NIT are decided by the PAT, and the PID values for the EIT, ETT, and RRT are decided by the MGT. Meanwhile, when identifying the main service data packet and the mobile service data packet by using the PID, it is preferable to distinguish the PID for the PSI/PSIP tables for mobile service from the PID for the PSI/PSIP tables for main service.

FIG. 8B illustrates PID and table ID of the PSI/PSIP tables used in the mobile service. The PIDs of PAT-E, CAT-E, MGT-E, VCT-E, and RRT-E defined in FIG. 8B are different from the IDs of the corresponding tables shown in FIG. 8A. More specifically, referring to FIG. 8B, the tables each having a fixed PID value includes the PAT-e (e.g., 0x1FF7), the CAT-E (e.g., 0x1FF9), the MGT-E (e.g., 0x1FF8), the VCT-E (e.g., 0x1FF8), and the RRT-E (e.g., 0x1FF8). Also, in case of the tables each having variable PID values, the PID values for the PMT-E and NIT-E are decided by the PAT-E, and the PID values for the EIT-E, ETT-E, and RRT-E are decided by the MGT-E. The PIDs shown in FIG. 8B are merely exemplary, and other PID values that can be differentiated from the PSI/PSIP tables for the main service may be allocated as used. Referring to FIG. 8B, the syntax and table ID of each table may be used identically as those of the PSI/PSIP tables for main service. Furthermore, each of the PSI/PSIP tables for mobile service is required to be periodically multiplexed, so that the related information can be provided to the transmitter 200 and the receiving system. And, the maximum multiplexing cycle for each table (i.e., maximum_cycle_time) may be variably set based upon the characteristics of each table and the data rates of the mobile service data.

Figure 9:
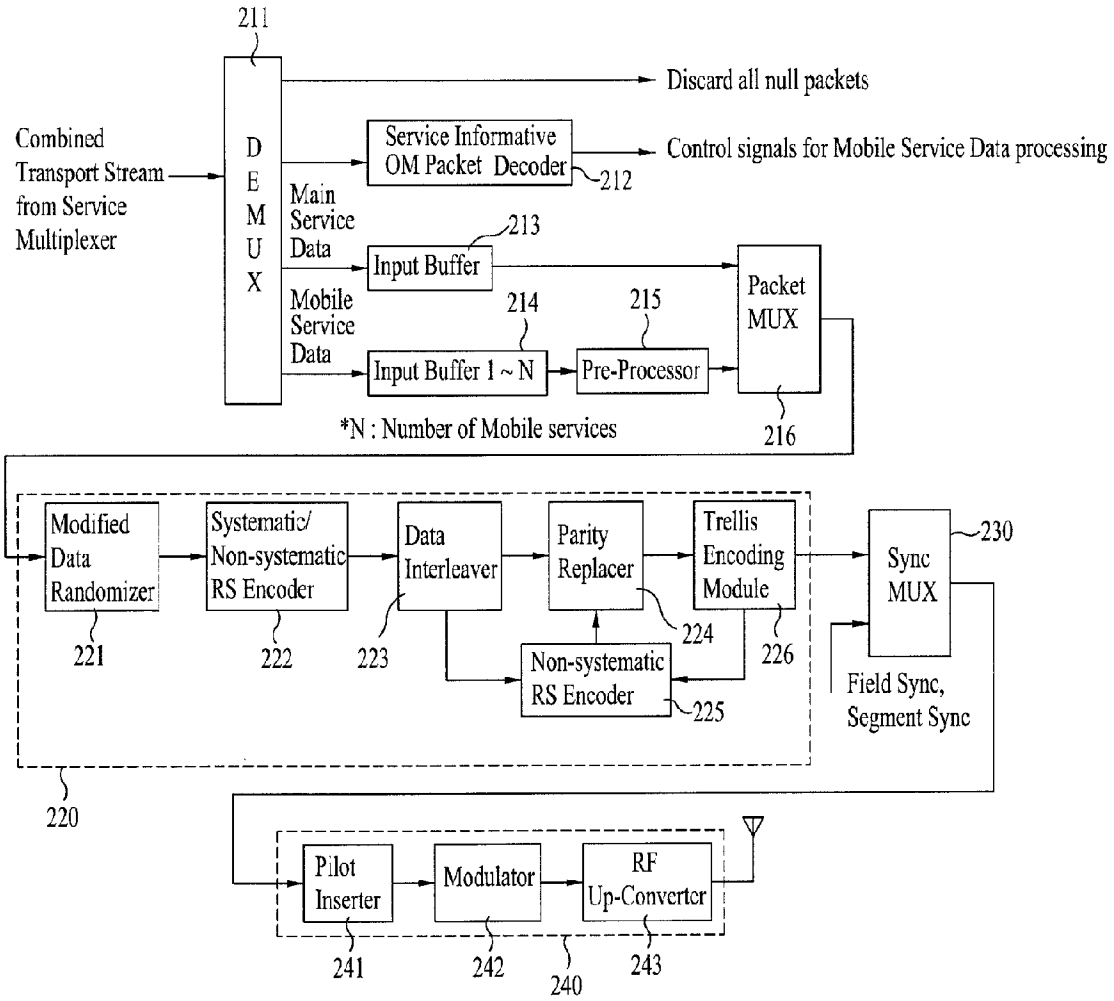
FIG. 9 illustrates a block diagram showing an example of a transmitter of FIG. 1.

FIG. 9 illustrates a block diagram showing an example of the transmitter 200 according to an embodiment of the present invention. Herein, the transmitter 200 includes a demultiplexer 211, an OM packet decoder 212, an input buffer 213 for main service, an input buffer 214 for mobile service, a pre-processor 215, a packet multiplexer 216, a post-processor 220, a synchronization (sync) multiplexer 230, and a transmission unit 240. Herein, a data packet transmitted from the service multiplexer 100 is inputted to the demultiplexer 211 of the transmitter 200. Then, the demultiplexer 211 determines whether or not the data packet corresponds to a main service data packet or a mobile service data packet. The main service data packet identified by the demultiplexer 211 is provided to the input buffer 213 for main service, and the mobile service data packet identified by the demultiplexer 211 is provided to the input buffer 214 for mobile service. At this point, the demultiplexer 211 may use a plurality of methods for identifying (or determining) whether or not the corresponding data packet is a main service data packet or a mobile service data packet.

According to an embodiment of the present invention, the corresponding data packet may be identified as either the main service data packet or the mobile service data packet, based upon a PID value of the data packet that is being inputted. More specifically, the demultiplexer 211 provides data packets having PIDs allocated to main service data packets to the input buffer 213 for main service. Similarly, the demultiplexer 211 provides data packets having PIDs allocated to mobile service data packets to the input buffer 214 for mobile service. The PID information may be extracted through a PSI/PSIP table transmitted from the service multiplexer 100.

According to another embodiment of the present invention, the demultiplexer 211 may identify (or determine) the inputted data packet as one of the mobile service data packet and the main service data packet, based upon the synchronization byte within the inputted data packet. Additionally, the demultiplexer 211 also determines whether the inputted data corresponds to a null data packet or an OM packet having an SI packet inserted therein. For example, the null data packet may be identified by referring to a value of a transport_error_indicator flag field of the inputted data packet. The null data packet identified by the demultiplexer 211 is not processed. However, the identified data packet is not provided to other blocks or to the receiving system either.

On the other hand, the OM packet may be identified by referring to the PID of the inputted data packet. For example, when the PID of the inputted data packet is equal to '0xFFA', the demultiplexer 211 determines the inputted data packet as an OM packet, thereby providing the corresponding data packet to the OM packet decoder 212. The OM packet decoder 212 parses the value of the OM_type field within the OM packet, so as to verify whether or not a SI packet has been inserted in the corresponding OM packet. IF the OM_type field value indicates that the SI packet has been inserted, the OM packet decoder 212 decodes the subsequent OM_payload field, thereby extracting the transmission parameters. The extracted transmission parameters are then provided to each block (e.g., the pre-processor 215, the packet multiplexer 216, etc.) requiring specific transmission parameters. Thus, each corresponding block may adequately utilize each transmission parameter.

Herein, for example, the transmission parameters may include a mobile service identification information, a super frame information, a burst size information, a burst period information, a turbo code information, a RS code information, and so on (shown in FIG. 4A). The information included in the transmission parameter is merely exemplary to facilitate the understanding of the present invention. And, the adding and deleting of the information included in the transmission parameter may be easily modified and changed by anyone skilled in the art. Therefore, the present invention is not limited to the examples proposed in the description set forth herein.

Meanwhile, the PSI/PSIP table for main service and the PSI/PSIP table for mobile service both transmitted from the service multiplexer 100 may be directly transmitted to the receiving system without any modification, or may be reconfigured an then transmitted to the receiving system. For example, it is assumed that the PAT for main service and the PAT for mobile service are integrated a single PAT and then transmitted. In this case, the input buffer 213 for main service may receive only the PAT having the information for mobile service deleted from the integrated PAT. Similarly, the input buffer 214 for mobile service may receive only the PAT having the information for main service deleted from the integrated PAT.

The input buffer 213 for main service receives and temporarily stores the main service data packet and the PSI/PSIP table for main service. Thus, the input buffer 213 for main service may perform packet jitter mitigation, null packet insertion, and PCR adjustment. The input buffer 214 for mobile service is provided as much as the number of mobile services. Each input buffer 214 for mobile service receives and temporarily stores the mobile service data packet and the PSI/PSIP table for mobile service. Accordingly, each input buffer 214 for mobile service may perform null packet insertion and PCR adjustment. The output of the input buffer 213 for main service is sent to the packet multiplexer 216, and the output of the input buffer 214 for mobile service passes through the pre-processor 215 and is then sent to the packet multiplexer 216. The pre-processor 215 additional encoding on the mobile service data packet, thereby enabling the mobile service data to respond more effectively to noise and channel environment that undergoes frequent changes. The additionally encoded mobile service data are then outputted to the packet multiplexer 216.

Figure 10:
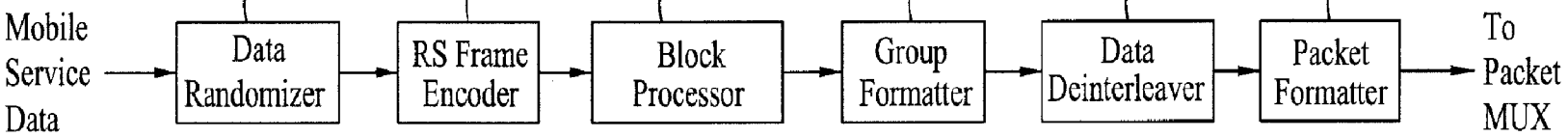
FIG. 10 illustrates a block diagram showing an example of a pre-processor of FIG. 9.

FIG. 10 illustrates a block diagram of the pre-processor 215 according to an embodiment of the present invention. Herein, the pre-processor 215 includes a data randomizer 401, a RS frame encoder 402, a block processor 403, a group formatter 404, a data deinterleaver 405, and a packet formatter 406. The pre-processor 215 according to the embodiment of the present invention refers to the transmission parameter provided by the OM packet decoder 212, thereby performing additional encoding on the inputted mobile service data. More specifically, the data randomizer 401 receives mobile service data and randomizes the received mobile service data, thereby outputting the processed data to the RS frame encoder 402. At this point, by having the data randomizer 401 randomize the mobile service data, a later randomizing process on the mobile service data performed by the data randomizer 221 of the post-processor 220 may be omitted.

The RS frame encoder 402 groups a plurality of the received mobile service data packets that have been randomized. Then, the RS frame encoder 402 performs at least one of an error correction encoding process and an error detection encoding process on the received randomized mobile service data. Furthermore, the RS frame encoder 402 may also group a plurality of RS frames so as to configure a super frame, thereby performing interleaving (or permutation) processes in super frame units. Thus, by providing robustness on the mobile service data, the corresponding data may be able to respond to the severely vulnerable and frequently changing frequency environment.

More specifically, when the RS frame encoder 402 performs row permutation based upon a predetermined rule for permuting each row of the super frame, the row positions within the super frame after the row permutation process may differ from the row positions within the super frame prior to the row permutation (or interleaving) process. Herein, by performing the row permutation (or interleaving) process in super frame units, even though the section having a plurality of errors occurring therein becomes very long, and even though the number of errors included in the RS frame that is to be decoded exceeds the extent of being able to be corrected, the errors become dispersed within the entire super frame. Thus, the decoding ability is even more enhanced as compared to a single RS frame.

In the RS frame encoder 402 according to the embodiment of the present invention, RS encoding is applied as the error correction encoding process, and cyclic redundancy check (CRC) encoding is applied as the error detection encoding process. When performing RS encoding, parity data that are to be used for error correction are generated. And, when performing CRC encoding, CRC data that are to be used for error detection are generated. Also, in the present invention, the RS encoding corresponds to the forward error correction (FEC) method. The FEC corresponds to a technique for compensating errors that occur during the transmission process. The CRC data generated by CRC encoding may be used for indicating whether or not the mobile service data have been damaged by the errors while being transmitted through the channel. In the present invention, a variety of error detection coding methods other than the CRC encoding method may be used, or the error correction coding method may be used to enhance the overall error correction ability (or performance) of the receiving system.

Herein, the RS frame encoder 402 refers to the pre-set transmission parameter and/or refers to the transmission parameter provided from the OM packet decoder 212, thereby being able to perform processes including RS frame configuration, RS encoding, CRC encoding, super frame configuration, and row permutation (or interleaving) in super frame units. For example, when the transmission parameter within the RS code mode (shown in FIG. 7A and FIG. 7B) is equal to '1110', the RS frame encoder 402 performs (235, 187)-RS encoding on the RS frame that is to be allocated to regions A/B, thereby generating 48 parity data bytes. Alternatively, the RS frame encoder 402 performs (223,187)-RS encoding on the RS frame that is to be allocated to region C, thereby generating 36 parity data bytes.

As described above, the mobile service data encoded by the RS frame encoder 402 are inputted to the block processor 403. The block processor 403 then encodes the inputted mobile service data at a coding rate of G/H (wherein, G is smaller than H (i.e., G<H)) and then outputted to the group formatter 404. More specifically, the block processor 403 divides the mobile service data being inputted in byte units into bit units. Then, the G number of bits is encoded to H number of bits. Thereafter, the encoded bits are converted back to byte units and then outputted. For example, if 1 bit of the input data is coded to 2 bits and outputted, then G is equal to 1 and H is equal to 2 (i.e., G=1 and H=2). Alternatively, if 1 bit of the input data is coded to 4 bits and outputted, then G is equal to 1 and H is equal to 4 (i.e., G=1 and H=4). Hereinafter, the former coding rate will be referred to as a coding rate of ½ (½-rate coding), and the latter coding rate will be referred to as a coding rate of ¼ (¼-rate coding), for simplicity.

Herein, when using the ¼ coding rate, the coding efficiency is greater than when using the ½ coding rate, and may, therefore, provide greater and enhanced error correction ability. For such reason, when it is assumed that the data encoded at a ¼ coding rate in the group formatter 404, which is located near the end portion of the system, are allocated to a region in which the receiving performance may be deteriorated, and that the data encoded at a ½ coding rate are allocated to a region having excellent receiving performance, the difference in performance may be reduced.

At this point, the block processor 403 may also receive signaling information, such as the transmission parameters. Herein, the signaling information is also encoding at the coding rate of ½ or the coding rate of ¼, which is similarly performed in the step of processing the mobile service data. Afterwards, the signaling information is considered and treated identically as the mobile service data. Meanwhile, the group formatter 404 inserts mobile service data that are outputted from the block processor 403 in corresponding regions within a data group, which is configured in accordance with a pre-defined rule. Also, with respect to the data deinterleaving process, each place holder or known data are also inserted in corresponding regions within the data group. At this point, the data group may be divided into at least one hierarchical region. Herein, the type of mobile service data being inserted to each region may vary depending upon the characteristics of each hierarchical region. For example, each region may be divided based upon the receiving performance within the data group.

In an example given in the present invention, a data group is divided into A, B, and C regions in a data configuration prior to data deinterleaving. At this point, the group formatter 404 allocates the mobile service data, which are inputted after being RS encoded and block encoded, to each of the corresponding regions by referring to the transmission parameter. FIG. 11A illustrates an alignment of data after being data interleaved and identified, and FIG. 11B illustrates an alignment of data before being data interleaved and identified. More specifically, a data structure identical to that shown in FIG. 11A is transmitted to a receiving system. Also, the data group configured to have the same structure as the data structure shown in FIG. 11A is inputted to the data deinterleaver 405.

As described above, FIG. 11A illustrates a data structure prior to data deinterleaving that is divided into 3 regions, such as region A, region B, and region C. Also, in the present invention, each of the regions A to C is further divided into a plurality of regions. Referring to FIG. 11A, region A is divided into 5 regions (A1 to A5), region B is divided into 2 regions (B1 and B2), and region C is divided into 3 regions (C1 to C3). Herein, regions A to C are identified as regions having similar receiving performances within the data group. Herein, the type of mobile service data, which are inputted, may also vary depending upon the characteristic of each region.

In the example of the present invention, the data structure is divided into regions A to C based upon the level of interference of the main service data. Herein, the data group is divided into a plurality of regions to be used for different purposes. More specifically, a region of the main service data having no interference or a very low interference level may be considered to have a more resistant (or robust) receiving performance as compared to regions having higher interference levels. Additionally, when using a system inserting and transmitting known data in the data group, and when consecutively long known data are to be periodically inserted in the mobile service data, the known data having a predetermined length may be periodically inserted in the region having no interference from the main service data (e.g., region A). However, due to interference from the main service data, it is difficult to periodically insert known data and also to insert consecutively long known data to a region having interference from the main service data (e.g., region B and region C).

Hereinafter, examples of allocating data to region A (A1 to A5), region B (B1 and B2), and region C (C1 to C3) will now be described in detail with reference to FIG. 11A. The data group size, the number of hierarchically divided regions within the data group and the size of each region, and the number of mobile service data bytes that can be inserted in each hierarchically divided region of FIG. 11A are merely examples given to facilitate the understanding of the present invention. Herein, the group formatter 404 creates a data group including places in which field synchronization data bytes are to be inserted, so as to create the data group that will hereinafter be described in detail.

More specifically, region A is a region within the data group in which a long known data sequence may be periodically inserted, and in which includes regions wherein the main service data are not mixed (e.g., A1 to A5). Also, region A includes a region A1 located between a field synchronization region and the region in which the first known data sequence is to be inserted. The field synchronization region has the length of one segment (i.e., 832 symbols).

For example, referring to FIG. 11A, 2428 bytes of the mobile service data may be inserted in region A1, 2580 bytes may be inserted in region A2, 2772 bytes may be inserted in region A3, 2472 bytes may be inserted in region A4, and 2772 bytes may be inserted in region A5. Herein, trellis initialization data or known data, MPEG header, and RS parity are not included in the mobile service data of region A. As described above, when region A includes a known data sequence at both ends, the receiving system uses channel information that can obtain known data or field synchronization data, so as to perform equalization, thereby providing enforced equalization performance.

Also, region B includes region B1 located within 8 segments at the beginning of a field synchronization region within the data group (chronologically placed before region A1), and region B2 located within 8 segments behind the very last known data sequence which is inserted in the data group. For example, 930 bytes of the mobile service data may be inserted in the region B1, and 1350 bytes may be inserted in region B2. Similarly, trellis initialization data or known data, MPEG header, and RS parity are not included in the mobile service data of region B. In case of region B, the receiving system may perform equalization by using channel information obtained from the field synchronization region. Alternatively, the receiving system may also perform equalization by using channel information that may be obtained from the last known data sequence, thereby enabling the system to respond to the channel changes.

Region C includes region C1 located within 30 segments including and preceding the $9^{th}$ segment of the field synchronization region (chronologically located before region A), region C2 located within 12 segments including and following the $9^{th}$ segment of the very last known data sequence within the data group (chronologically located after region A), and region C3 located in 32 segments after the region C2. For example, 1272 bytes of the mobile service data may be inserted in the region C1, 1560 bytes may be inserted in region C2, and 1312 bytes may be inserted in region C3. Similarly, trellis initialization data or known data, MPEG header, and RS parity are not included in the mobile service data. Herein, region C (e.g., region C1) is located chronologically earlier than (or before) region A.

Since region C1 is located further apart from the field synchronization region which corresponds to the closest known data region, the receiving system may use the channel information obtained from the field synchronization data when performing channel equalization. Alternatively, the receiving system may also use the most recent channel information of a previous data group. Furthermore, in region C2 and region C3 located before region A, the receiving system may use the channel information obtained from the last known data sequence to perform equalization. However, when the channels are subject to fast and frequent changes, the equalization may not be performed perfectly. Therefore, the equalization performance of region C may be deteriorated as compared to that of region B.

When it is assumed that the data group is allocated with a plurality of hierarchically divided regions, as described above, the block processor 403 may encode the mobile service data, which are to be inserted to each region based upon the turbo code mode within the transmission parameter, at a different coding rate. For example, when the turbo code mode is equal to '011' (as shown in FIG. 6), the block processor 403 may encode the mobile service data, which are to be inserted in regions A1 to A5 of region A, at a coding rate of ½. Then, the group formatter 404 may insert the ½-rate encoded mobile service data to regions A1 to A5.

The block processor 403 may encode the mobile service data, which are to be inserted in regions B1 and B2 of region B, at a coding rate of ¼ having higher error correction ability as compared to the ½-coding rate. Then, the group formatter 404 inserts the ¼-rate coded mobile service data in region B1 and region B2. Furthermore, the block processor 403 may encode the mobile service data, which are to be inserted in regions C1 to C3 of region C, at a coding rate of ¼ or a coding rate having higher error correction ability than the ¼-coding rate. Then, the group formatter 404 may either insert the encoded mobile service data to regions C1 to C3, as described above, or leave the data in a reserved region for future usage.

Also, apart from the mobile service data, the group formatter 404 also inserts signaling information including the transmission parameter. The transmitter 200 transmits transmission parameters to the receiving system. For example, the transmission parameters include data group information, region information within a data group, the number of RS frames configuring a super frame (i.e., a super frame size (SFS)), the number of RS parity data bytes (P) for each column within the RS frame, whether or not a checksum, which is added to determine the presence of an error in a row direction within the RS frame, has been used, the type and size of the checksum if the checksum is used (presently, 2 bytes are added to the CRC), the number of data groups configuring one RS frame—since the RS frame is transmitted to one burst section, the number of data groups configuring the one RS frame is identical to the number of data groups within one burst (i.e., burst size (BS)), a turbo code mode, and a RS code mode.

Also, the transmission parameter required for receiving a burst includes a burst period—herein, one burst period corresponds to a value obtained by counting the number of fields starting from the beginning of a current burst until the beginning of a next burst, a positioning order of the RS frames that are currently being transmitted within a super frame (i.e., a permuted frame index (PFI)) or a positioning order of groups that are currently being transmitted within a RS frame (burst) (i.e., a group index (GI)), and a burst size. Depending upon the method of managing a burst, the transmission parameter also includes the number of fields remaining until the beginning of the next burst (i.e., time to next burst (TNB)). And, by transmitting such information as the transmission parameter, each data group being transmitted to the receiving system may indicate a relative distance (or number of fields) between a current position and the beginning of a next burst. The diverse information included in the transmission parameter merely corresponding to examples given to facilitate the understanding of the present invention. Therefore, the proposed examples do not limit the scope or spirit of the present invention and may be easily varied or modified by anyone skilled in the art.

In addition, apart from the encoded mobile service data outputted from the block processor 403, as shown in FIG. 11A, the group formatter 404 also inserts MPEG header place holders, non-systematic RS parity place holders, main service data place holders, which are related to data deinterleaving in a later process. Herein, the main service data place holders are inserted because the mobile service data bytes and the main service data bytes are alternately mixed with one another in region B and region C, based upon the input of the data deinterleaver. For example, based upon the data outputted after the data-deinterleaving process, the place holder for the MPEG header may be allocated at the very beginning of each packet.

Furthermore, the group formatter 404 either inserts known data generated in accordance with a pre-determined method or inserts known data place holders for inserting the known data in a later process. Additionally, place holders for initializing the trellis encoding module 226 are also inserted in the corresponding regions. For example, the initialization data place holders may be inserted in the beginning of the known data sequence. Herein, the size of the mobile service data that can be inserted in a data group may vary in accordance with the sizes of the trellis initialization data or known data (or known data place holders), MPEG header place holders, and RS parity place holders.

The data outputted from the group formatter 404 are inputted to the data deinterleaver 405. And, the data deinterleaver 405 deinterleaves data by performing an inverse process of the data interleaver on the data and place holders within the data group, which are then outputted to the packet formatter 406. More specifically, when the data and data place holders within the data group configured as shown in FIG. 11A are deinterleaved by the data deinterleaver 405, the data group being outputted to the packet formatter 406 is configured as shown in FIG. 11B. The packet formatter 406 removes the main service data place holders and the RS parity place holders that were allocated for the deinterleaving process from the deinterleaved data being inputted. Then, the packet formatter 406 groups the remaining portion and replaces the 4-byte MPEG header place holder with an MPEG header having a null packet PID (or a PID that is not used in the main service data packet).

Also, when the group formatter 404 inserts known data place holders, the packet formatter 406 may insert actual known data in the known data place holders, or may directly output the known data place holders without any modification in order to make replacement insertion in a later process. Thereafter, the packet formatter 406 identifies the data within the packet-formatted data group, as described above, as a 188-byte unit mobile service data packet (i.e., MPEG TS packet), which is then provided to the packet multiplexer 216.

The packet multiplexer 216 multiplexes the mobile service data packet outputted from the pre-processor 215 and the main service data packet outputted from the input buffer 213 in accordance with a pre-defined multiplexing method. Then, the packet multiplexer 216 outputs the multiplexed data packets to the data randomizer 221 of the post-processor 220. Herein, the multiplexing method may vary in accordance with various variables of the system design. One of the multiplexing methods of the packet multiplexer 216 consists of providing a burst-on section and a burst-off section along a time axis and, then, transmitting a plurality of data groups during a burst-on section and transmitting only the main service data during a burst-off section. At this point, main service data may also be transmitted in the burst-on section. Furthermore, the packet multiplexer 216 can refer to transmission parameters (e.g., information such as burst size or burst period) so as to determine the number and cycle periods of data groups included in a single burst.

In this case, mobile service data and main service data co-exist in a burst-on section, and only the main service data exist in the burst-off section. Therefore, the main service data section transmitting the main service data exist in both the burst-on section and the burst-off section. At this point, the number of main service data packets included in the main service data section within the burst-on section and the number of main service data packets included in the main service data section within the burst-off section may be equal to or different from one another. When the mobile service data are transmitted in burst units, as described above, a receiving system that only receives the mobile service data may turn on the power only during the burst-on section so as to receive the corresponding data. Also, in this case, the receiving system may turn off the power during burst-off sections, thereby preventing the main service data from being received. Thus, the receiving system is capable of reducing excessive power consumption.

However, since a data group including mobile service data in-between the data bytes of the main service data during the packet multiplexing process, the shifting of the chronological position (or place) of the main service data packet becomes relative. Also, a system object decoder (i.e., MPEG decoder) for processing the main service data of the receiving system, receives and decodes only the main service data and recognizes the mobile service data packet as a null data packet. Therefore, when the system object decoder of the receiving system receives a data group including mobile service data and a main service data packet that is multiplexed with the data group, a packet jitter occurs.

At this point, since a multiple-level buffer for the video data exists in the system object decoder and the size of the buffer is relatively large, the packet jitter generated from the packet multiplexer 216 does not cause any serious problem in case of the video data. However, since the size of the buffer for the audio data is relatively small, the packet jitter may cause some problem. More specifically, due to the packet jitter, an overflow or underflow may occur in the buffer for the main service data of the receiving system (e.g., the buffer for the audio data). Therefore, the input buffer 213 for main service readjusts the relative position of the main service data packet so that the overflow or underflow does not occur in the system object decoder included in the receiving system.

In the present invention, examples of repositioning places for the audio data packets within the main service data in order to minimize the influence on the operations of the audio buffer will be described in detail. The input buffer 213 for main service repositions audio packets of the main service data section so that the audio data packets of the main service can be positioned as equally and uniformly as possible. The standard for repositioning the audio data packets in the main service data performed by the input buffer 213 for main service will now be described Herein, it is assumed that the input buffer 213 for main service knows the same multiplexing information as that of the packet multiplexer 216, which is placed further behind the input buffer 213 for main service.

Firstly, if one audio data packet exists in the main service data section (e.g., the main service data section positioned between two data groups) within the burst section, the audio data packet is positioned at the very beginning of the main service data section. Alternatively, if two audio data packets exist in the corresponding data section, one audio data packet is positioned at the very beginning and the other audio data packet is positioned at the very end of the main service data section. Further, if more than three audio data packets exist, one audio data packet is positioned at the very beginning of the main service data section, another is positioned at the very end of the main service data section, and the remaining audio data packets are positioned between the first and last audio Secondly, during the main service data section before the beginning of a burst section, the audio data packet is placed at the very end of the main service data section. Thirdly, during a main service data section after the end of burst section, the audio data packet is positioned at the very beginning of the main service data section. And, finally, the data packets other than audio data packets are positioned to vacant spaces (i.e., spaces that are not designated for the audio data packets) in accordance with the inputted order. Meanwhile, when the positions of the main service data packets are relatively readjusted, associated program clock reference (PCR) values may also be modified accordingly. The PCR value corresponds to a time reference value for synchronizing the time of the MPEG decoder. Herein, the PCR value is inserted in a specific region of a TS packet and then transmitted. In the embodiment of the present invention, the input buffer 213 for main service may also perform the function of correcting (or modifying) the PCR value.

The data outputted from the input buffer 213 for main service are inputted to the packet multiplexer 216. As described above, the packet multiplexer 216 multiplexes the main service data packet outputted from the input buffer 213 for main service with the mobile service data packet outputted from the pre-processor 215 into a burst structure in accordance with a pre-determined multiplexing rule. Then, the packet multiplexer 216 outputs the multiplexed data packets to the data randomizer 221 of the post-processor 220.

If the inputted data correspond to the main service data packet, the data randomizer 221 performs the same randomizing process as that of the conventional randomizer. More specifically, the synchronization byte within the main service data packet is deleted. Then, the remaining 187 data bytes are randomized by using a pseudo random byte generated from the data randomizer 221. Thereafter, the randomized data are outputted to the RS encoder/non-systematic RS encoder 222. On the other hand, if the inputted data correspond to the mobile service data packet, the data randomizer 221 deletes the synchronization byte from the 4-byte MPEG header included in the mobile service data packet and, then, performs the randomizing process only on the remaining 3 data bytes of the MPEG header. Thereafter, the randomized data bytes are outputted to the RS encoder/non-systematic RS encoder 222.

Additionally, the randomizing process is not performed on the remaining portion of the mobile service data excluding the MPEG header. In other words, the remaining portion of the mobile service data packet is directly outputted to the RS encoder/non-systematic RS encoder 222 without being randomized. This is because a randomizing process has already been performed on the mobile service data in the data randomizer 401. Also, the data randomizer 221 may or may not perform a randomizing process on the known data (or known data place holders) and the initialization data place holders included in the mobile service data packet.

The RS encoder/non-systematic RS encoder 222 performs an RS encoding process on the data being randomized by the data randomizer 221 or on the data bypassing the data randomizer 221, so as to add 20 bytes of RS parity data. Thereafter, the processed data are outputted to the data interleaver 223. Herein, if the inputted data correspond to the main service data packet, the RS encoder/non-systematic RS encoder 222 performs the same systematic RS encoding process as that of the conventional VSB system, thereby adding the 20-byte RS parity data at the end of the 187-byte data. Alternatively, if the inputted data correspond to the mobile service data packet, the RS encoder/non-systematic RS encoder 222 performs a non-systematic RS encoding process. At this point, the 20-byte RS parity data obtained from the non-systematic RS encoding process are inserted in a pre-decided parity byte place within the mobile service data packet.

The data interleaver 223 corresponds to a byte unit convolutional interleaver. The output of the data interleaver 223 is inputted to the parity replacer 224 and to the non-systematic RS encoder 225. Meanwhile, a process of initializing a memory within the trellis encoding module 226 is primarily required in order to decide the output data of the trellis encoding module 226, which is located after the parity replacer 224, as the known data pre-defined according to an agreement between the receiving system and the transmitting system. More specifically, the memory of the trellis encoding module 226 should first be initialized before the received known data sequence is trellis-encoded. At this point, the beginning portion of the known data sequence that is received corresponds to the initialization data place holder and not to the actual known data. Herein, the initialization data place holder has been included in the data by the group formatter 404 in an earlier process. Therefore, the process of generating initialization data and replacing the initialization data place holder of the corresponding memory with the generated initialization data are required to be performed immediately before the inputted known data sequence is trellis-encoded.

Additionally, a value of the trellis memory initialization data is decided and generated based upon a memory status of the trellis encoding module 226. Further, due to the newly replaced initialization data, a process of newly calculating the RS parity and replacing the RS parity, which is outputted from the data interleaver 223, with the newly calculated RS parity is required. Therefore, the non-systematic RS encoder 225 receives the mobile service data packet including the initialization data place holders, which are to be replaced with the actual initialization data, from the data interleaver 223 and also receives the initialization data from the trellis encoding module 226.

Among the inputted mobile service data packet, the initialization data place holders are replaced with the initialization data, and the RS parity data that are added to the mobile service data packet. Thereafter, a new non-systematic RS parity is calculated and then outputted to the parity replacer 224. Accordingly, the parity replacer 224 selects the output of the data interleaver 223 as the data within the mobile service data packet, and the parity replacer 224 selects the output of the non-systematic RS encoder 225 as the RS parity data. Then, the selected data are outputted to the trellis encoding module 226.

Meanwhile, if the main service data packet is inputted or if the mobile service data packet, which does not include any initialization data place holders that are to be replaced, is inputted, the parity replacer 224 selects the data and RS parity that are outputted from the data interleaver 223. Then, the parity replacer 224 directly outputs the selected data to the trellis encoding module 226 without any modification. The trellis encoding module 226 converts the byte-unit data to symbol units and performs a 12-way interleaving process so as to trellis-encode the received data. Thereafter, the processed data are outputted to the synchronization multiplexer 230. The synchronization multiplexer 230 inserts a field synchronization signal and a segment synchronization signal to the data outputted from the trellis encoding module 226 and, then, outputs the processed data to the pilot inserter 241 of the transmission unit 240. Herein, the data having a pilot inserted by the pilot inserter 241 are modulated by the modulator 242 in accordance with a pre-decided modulating method (e.g., VSB method). Thereafter, the modulated data are transmitted to each receiving system through the radio frequency (RF) up-converter 243.

Figure 12:
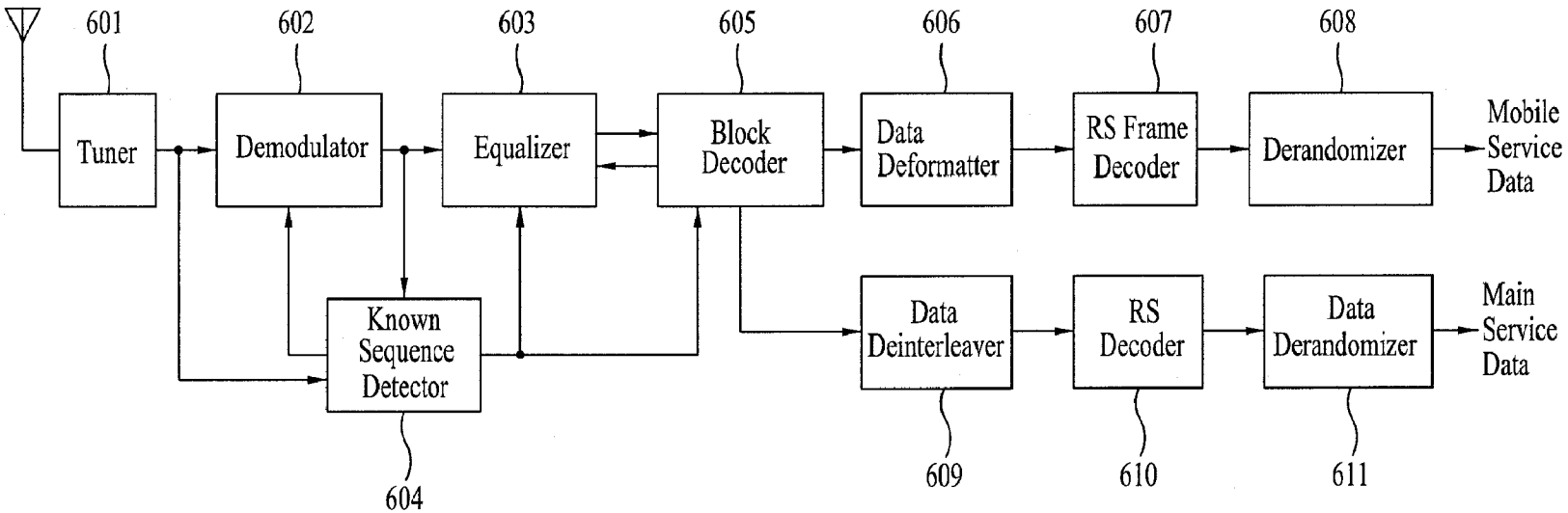
FIG. 12 illustrates a block diagram showing a structure of a receiving system according to an embodiment of the present invention.

FIG. 12 illustrates a block diagram showing a structure of a receiving system according to the present invention. The receiving system of FIG. 12 uses transmission parameters and known data information, which are transmitted by the transmitting system, so as to perform carrier recovery, timing recovery, frame synchronization recovery, and channel equalization, thereby enhancing the receiving performance.

Referring to FIG. 12, the receiving system includes a tuner 601, a demodulator 602, an equalizer 603, a known data detector (or known sequence detector) 604, a block decoder 605, a data deformatter 606, a RS frame decoder 607, a derandomizer 608, a data deinterleaver 609, a RS decoder 610, and a data derandomizer 611. Herein, for simplicity of the description of the present invention, the data deformatter 606, the RS frame decoder 607, and the derandomizer 608 will be collectively referred to as a mobile service data processing unit. And, the data deinterleaver 609, the RS decoder 610, and the data derandomizer 611 will be collectively referred to as a main service data processing unit.

More specifically, the tuner 601 tunes a frequency of a particular channel and down-converts the tuned frequency to an intermediate frequency (IF) signal. Then, the tuner 601 outputs the down-converted IF signal to the demodulator 602 and the known sequence detector 604. The demodulator 602 performs self gain control, carrier recovery, and timing recovery processes on the inputted IF signal, thereby modifying the IF signal to a baseband signal. The equalizer 603 compensates the distortion of the channel included in the demodulated signal and then outputs the error-compensated signal to the block decoder 605.

At this point, the known sequence detector 604 detects the known sequence place inserted by the transmitting end from the input/output data of the demodulator 602 (i.e., the data prior to the demodulation process or the data after the demodulation process). Thereafter, the place information (or position indicator) along with the symbol sequence of the known data, which are generated from the detected place, is outputted to the demodulator 602 and the equalizer 603. Also, the known sequence detector 604 outputs a set of information to the block decoder 605. This set of information is used to allow the block decoder 605 of the receiving system to identify the mobile service data that are processed with additional encoding from the transmitting system and the main service data that are not processed with additional encoding.

In addition, although the connection status is not shown in FIG. 12, the information detected from the known sequence detector 604 may be used throughout the entire receiving system and may also be used in the data deformatter 606 and the RS frame decoder 607. The demodulator 602 uses the known data (or sequence) position indicator and the known data symbol sequence during the timing and/or carrier recovery, thereby enhancing the demodulating performance. Similarly, the equalizer 603 uses the known sequence position indicator and the known data symbol sequence so as to enhance the equalizing performance. Moreover, the decoding result of the block decoder 605 may be fed-back to the equalizer 603, thereby enhancing the equalizing performance.

The equalizer 603 may perform channel equalization by using a plurality of methods. An example of estimating a channel impulse response (CIR) in the field synchronization section and the known data section, so as to perform channel equalization will be given in the description of the present invention. Most particularly, an example of estimating the CIR in accordance with each region within the data group, which is hierarchically divided and transmitted from the transmitting system, and applying each CIR differently will also be described herein. Furthermore, by using the known data, the place and contents of which is known in accordance with an agreement between the transmitting system and the receiving system, and the field synchronization data, so as to estimate the CIR, the present invention may be able to perform channel equalization with more stability.

Herein, the data group that is inputted for the equalization process is divided into regions A to C, as shown in FIG. 11A. More specifically, in the example of the present invention, each region A, B, and C are further divided into regions A1 to A5, regions B1 and B2, and regions C1 to C3, respectively. Referring to FIG. 11A, the CIR that is estimated from the field synchronization data in the data structure is referred to as CIR_FS. Alternatively, the CIRs that are estimated from each of the 5 known data sequences existing in region A are sequentially referred to as CIR_N0, CIR_N1, CIR_N2, CIR_N3, and CIR_N4.

As described above, the present invention uses the CIR estimated from the field synchronization data and the known data sequences in order to perform channel equalization on data within the data group. At this point, each of the estimated CIRs may be directly used in accordance with the characteristics of each region within the data group. Alternatively, a plurality of the estimated CIRs may also be either interpolated or extrapolated so as to create a new CIR, which is then used for the channel equalization process.

Herein, when a value F(Q) of a function F(x) at a particular point Q and a value F(S) of the function F(x) at another particular point S are known, interpolation refers to estimating a function value of a point within the section between points Q and S. Linear interpolation corresponds to the simplest form among a wide range of interpolation operations. The linear interpolation described herein is merely exemplary among a wide range of possible interpolation methods. And, therefore, the present invention is not limited only to the examples set forth herein.

Alternatively, when a value F(Q) of a function F(x) at a particular point Q and a value F(S) of the function F(x) at another particular point S are known, extrapolation refers to estimating a function value of a point outside of the section between points Q and S. Linear extrapolation is the simplest form among a wide range of extrapolation operations. Similarly, the linear extrapolation described herein is merely exemplary among a wide range of possible extrapolation methods. And, therefore, the present invention is not limited only to the examples set forth herein.

More specifically, in case of region C1, any one of the CIR_N4 estimated from a previous data group, the CIR_FS estimated from the current data group that is to be processed with channel equalization, and a new CIR generated by extrapolating the CIR_FS of the current data group and the CIR_N0 may be used to perform channel equalization. Alternatively, in case of region B1, a variety of methods may be applied as described in the case for region C1. For example, a new CIR created by linearly extrapolating the CIR_FS estimated from the current data group and the CIR_N0 may be used to perform channel equalization. Also, the CIR_FS estimated from the current data group may also be used to perform channel equalization. Finally, in case of region A1, a new CIR may be created by interpolating the CIR_FS estimated from the current data group and CIR_N0, which is then used to perform channel equalization. Furthermore, any one of the CIR_FS estimated from the current data group and CIR_N0 may be used to perform channel equalization.

In case of regions A2 to A5, CIR_N(i−1) estimated from the current data group and CIR_N(i) may be interpolated to create a new CIR and use the newly created CIR to perform channel equalization. Also, any one of the CIR_N(i−1) estimated from the current data group and the CIR_N(i) may be used to perform channel equalization. Alternatively, in case of regions B2, C2, and C3, CIR_N3 and CIR_N4 both estimated from the current data group may be extrapolated to create a new CIR, which is then used to perform the channel equalization process. Furthermore, the CIR_N4 estimated from the current data group may be used to perform the channel equalization process. Accordingly, an optimum performance may be obtained when performing channel equalization on the data inserted in the data group. The methods of obtaining the CIRs required for performing the channel equalization process in each region within the data group, as described above, are merely examples given to facilitate the understanding of the present invention. A wider range of methods may also be used herein. And, therefore, the present invention will not only be limited to the examples given in the description set forth herein.

Meanwhile, if the data being inputted to the block decoder 605 after being channel equalized from the equalizer 603 correspond to the mobile service data having block encoding and trellis encoding performed thereon by the transmitting system (i.e., data within the RS frame, and signaling information data), trellis decoding and block decoding processes are performed on the inputted data as inverse processes of the transmitting system. Alternatively, if the data being inputted to the block decoder 605 correspond to the main service data having only trellis encoding performed thereon, and not the block encoding (e.g., main service data), only the trellis decoding process is performed on the inputted data as the inverse process of the transmitting system.

The data trellis-decoded and block-decoded by the block decoder 605 are inputted to the data deformatter 606. The block decoder 605 removes the known data, trellis initialization data, and MPEG header, which are inserted in the data group, and the RS parity, which is added by the RS encoder/non-systematic RS encoder or non-systematic RS encoder of the transmitting system from the data included in the data group. Then, the processed data are outputted to the data deformatter 606. Herein, the removal of the data may be performed before the block decoding process, or may be performed during or after the block decoding process. If the transmitting system includes signaling information in the data group upon transmission, the signaling information is outputted to the data deformatter 606.

Meanwhile, the trellis-decoded data transmitted from the block decoder 605 are outputted to the data deinterleaver 609. At this point, the data trellis-decoded by the block decoder 605 and then outputted to the data deinterleaver 609 may include the main service data as well as the data within the RS frame and signaling information data. RS parity data, which are added by the transmitting system after the pre-processor 215 may also be included in the data being outputted to the data deinterleaver 609. In this case, the trellis decoder should be provided before the data deinterleaver 609. If the inputted data correspond to the trellis-encoded data that have not been block-encoded by the transmitting system, the block decoder 605 performs Viterbi decoding on the inputted data so as to output a hard decision value or to perform a hard-decision on a soft decision value, thereby outputting the result. On the other hand, if the inputted data correspond to the data both trellis-encoded and block-encoded by the transmitting system, the block decoder 605 outputs a soft decision value with respect to the inputted data.

In other words, if the inputted data correspond to the data block-encoded by the block processor 403 of the transmitting system and the data trellis-encoded by the trellis encoding module 256 of the transmitting system, the block decoder 605 performs trellis-decoding and block-decoding processes on the input data as inverse processes of the transmitting system. At this point, the RS frame encoder of the transmitting system may be viewed as an external code. And, the trellis encoding module may be viewed as an internal code. In order to maximize the performance of the external code when decoding such concatenated codes, the decoder of the internal code should output a soft decision value.

Meanwhile, the data deinterleaver 609, the RS decoder 610, and the data derandomizer 611 are blocks required for receiving the main service data. Therefore, the above-mentioned blocks may not be required in the structure of a receiving system that only receives the mobile service data. The data deinterleaver 609 performs an inverse process of the data interleaver included in the transmitting system. In other words, the data deinterleaver 609 deinterleaves the main service data outputted from the block decoder 605 and outputs the deinterleaved main service data to the RS decoder 610. The data being inputted to the data deinterleaver 609 may include main service data, as well as mobile service data, known data, RS parity data, and an MPEG header. At this point, among the inputted data, only the main service data and the RS parity data added to the main service data packet may be outputted to the RS decoder 610. Also, all data outputted after the data derandomizer 611 may all be removed with the exception for the main service data. In the embodiment of the present invention, only the main service data and the RS parity data added to the main service data packet are inputted to the RS decoder 610.

The RS decoder 610 performs a systematic RS decoding process on the deinterleaved data and outputs the processed data to the data derandomizer 611. The data derandomizer 611 receives the output of the RS decoder 610 and generates a pseudo random data byte identical to that of the randomizer included in the transmitting system. Thereafter, the data derandomizer 611 performs a bitwise exclusive OR (XOR) operation on the generated pseudo random data byte, thereby inserting the MPEG synchronization bytes to the beginning of each packet so as to output the data in 188-byte main service data packet units.

Meanwhile, the data being outputted from the block decoder 605 to the data deformatter 606 are inputted in the form of a data group. At this point, the data deformatter 606 already knows the structure of the data that are to be inputted and is, therefore, capable of identifying the signaling information, which includes the transmission parameters, and the mobile service data from the data group. Thereafter, the data deformatter 606 outputs the identified signaling information to a block (not shown) for processing the signaling information and outputs the identified mobile service data to the RS frame decoder 607. More specifically, the RS frame decoder 607 receives only the RS-encoded and CRC-encoded mobile service data that are transmitted from the data deformatter 606.

The RS frame encoder 607 performs an inverse process of the RS frame encoder included in the transmitting system so as to correct the error within the RS frame. Then, the RS frame decoder 607 adds the 1-byte MPEG synchronization service data packet, which had been removed during the RS frame encoding process, to the error-corrected mobile service data packet. Thereafter, the processed data packet is outputted to the derandomizer 608. The derandomizer 608 performs a derandomizing process, which corresponds to the inverse process of the randomizer included in the transmitting system, on the received mobile service data. Thereafter, the derandomized data are outputted, thereby obtaining the mobile service data transmitted from the transmitting system.

As described above, the digital broadcasting system and method of processing data according to the present invention have the following advantages. More specifically, the present invention is robust against (or resistant to) any error that may occur when transmitting mobile service data through a channel. And, the present invention is also highly compatible to the conventional system. Moreover, the present invention may also receive the mobile service data without any error even in channels having severe ghost effect and noise.

Additionally, by performing error correction encoding and error detection encoding processes on the mobile service data and transmitting the processed data, the present invention may provide robustness to the mobile service data, thereby enabling the data to effectively respond to the frequent change in channels. Also, when the present invention multiplexes the main service data and the mobile service data in a burst structure, a relative position of a main service data packet is re-adjusted and then multiplexed, thereby mitigating packet jitter, which may occur when the receiving system receives the multiplexed main service data packet.

Moreover, when the main service data and the mobile service data are multiplexed by the service multiplexer within the transmitting system, and when the multiplexed data are transmitted to the transmitter, the present invention transmits the mobile service-related information through the OM packet. Thus, the present invention may match (or fix) the data rate of the final output data of the service multiplexer to a constant data rate. The present invention may also enable the transmitter to process the mobile service data more easily. Furthermore, the present invention is even more effective when applied to mobile and portable receivers, which are also liable to a frequent change in channel and which require protection (or resistance) against intense noise.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A digital broadcast receiver, comprising:

a tuner configured to receive a broadcast signal comprising mobile service data, wherein the broadcast signal is transmitted from a broadcast transmitter by:

generating a Reed-Solomon (RS) frame by RS-encoding an RS frame payload with an RS code of (187+P, 187) and Cyclic Redundancy Check (CRC)-encoding the RS-encoded RS frame payload, thereby adding P bytes of first parity data at bottom ends of columns of the RS frame payload and adding 2 bytes of CRC data at right ends of rows of the RS frame payload including the first parity data, wherein the RS frame payload includes mobile service data, and wherein P is one of 24, 36, and 48, mapping, by a group formatter, a portion of the RS frame into at least one region of a first data group that has a plurality of regions, the first data group including a plurality of segments, wherein a number of mobile service data in an Nth segment of the first data group is less than a number of mobile service data in an (N+1)th segment of the first data group, wherein the number of mobile service data in the (N+1)th segment of the first data group is less than a number of mobile service data in an (N+2)th segment of the first data group, wherein the first data group further includes signaling information on a transmission parameter, and wherein the signaling information includes an RS code mode field indicating the RS code for the RS frame, trellis-encoding, by a trellis encoder, data being outputted from the group formatter, the trellis encoder having at least one memory that is initialized at each start of known data sequences, and multiplexing the trellis-encoded data with field synchronization data and segment synchronization data; a demodulator configured to perform demodulating on the broadcast signal; and a decoder configured to perform decoding on the demodulated broadcast signal.

2. The digital broadcast receiver of claim 1, wherein the group formatter adds the known data sequences to the first data group.

3. The digital broadcast receiver of claim 2, wherein the group formatter inserts place holders for second parity data and MPEG header data to the first data group.

4. The digital broadcast receiver of claim 3, further comprising:

a packet formatter configured to remove the place holders for the second parity data from a second data group generated by de-interleaving the first data group and replace the place holders for the MPEG header data with the MPEG header data in the second data group; and an RS encoder configured to RS-encode the second data group that includes the MPEG header data so as to add the second parity data to the second data group.

5. The digital broadcast receiver of claim 4, further comprising an interleaver configured to interleave the second data group.

6. The digital broadcast receiver of claim 1, wherein the signaling information further includes a turbo code mode field indicating an outer code mode for each region of the first data group.

7. A method of processing broadcast data in a digital broadcast receiver, the method comprising:

receiving, by a tuner, a broadcast signal comprising mobile service data, wherein the broadcast signal is transmitted from a broadcast transmitter by:

generating a Reed-Solomon (RS) frame by RS-encoding an RS frame payload with an RS code of (187+P, 187) and Cyclic Redundancy Check (CRC)-encoding the RS-encoded RS frame payload, thereby adding P bytes of first parity data at bottom ends of columns of the RS frame payload and adding 2 bytes of CRC data at right ends of rows of the RS frame payload including the first parity data, wherein the RS frame payload includes mobile service data, and wherein P is one of 24, 36, and 48, mapping, by a group formatter, a portion of the RS frame into at least one region of a first data group that has a plurality of regions, the first data group including a plurality of segments, wherein a number of mobile service data in an Nth segment of the first data group is less than a number of mobile service data in an (N+1)th segment of the first data group, wherein the number of mobile service data in the (N+1)th segment of the first data group is less than a number of mobile service data in an (N+2)th segment of the first data group, wherein the first data group further includes signaling information on a transmission parameter, and wherein the signaling information includes an RS code mode field indicating the RS code for the RS frame, trellis-encoding, by a trellis encoder, data being outputted from the group formatter, the trellis encoder having at least one memory that is initialized at each start of known data sequences, and multiplexing the trellis-encoded data with field synchronization data and segment synchronization data;

demodulating the broadcast signal; and decoding the demodulated broadcast signal.

8. The method of claim 7, wherein the group formatter adds the known data sequences to the first data group.

9. The method of claim 8, wherein the group formatter inserts place holders for second parity data and MPEG header data to the first data group.

10. The method of claim 9, further comprising:

removing the place holders for the second parity data from a second data group generated by de-interleaving the first data group;

replacing the place holders for the MPEG header data with the MPEG header data in the second data group; and RS-encoding the second data group that includes the MPEG header data so as to add the second parity data to the second data group.

11. The method of claim 10, further comprising interleaving the second data group.

12. The method of claim 7, wherein the signaling information further includes a turbo code mode field indicating an outer code mode for each region of the first data group.

*13. The digital broadcast receiver of claim 1, wherein the signaling information further includes service identification information for identifying a service that is provided by the mobile service data.*

*14. The method of claim 7, wherein the signaling information further includes service identification information for identifying a service that is provided by the mobile service data.*

* * * * *